US006754210B1

(12) United States Patent
Ofek

(10) Patent No.: US 6,754,210 B1
(45) Date of Patent: Jun. 22, 2004

(54) SHARED MEDIUM ACCESS SCHEDULING WITH COMMON TIME REFERENCE

(75) Inventor: Yoram Ofek, Riverdale, NY (US)

(73) Assignee: Synchrodyne Networks, Inc., Riverdale, NY (US)

( * ) Notice: Subject to any disclaimer, the term of this patent is extended or adjusted under 35 U.S.C. 154(b) by 0 days.

(21) Appl. No.: 09/362,334

(22) Filed: Jul. 28, 1999

Related U.S. Application Data

(63) Continuation of application No. 09/120,636, filed on Jul. 22, 1998.
(60) Provisional application No. 60/088,983, filed on Jun. 11, 1998.

(51) Int. Cl.[7] .............................................. H04L 12/28
(52) U.S. Cl. ...................................... 370/389; 370/392
(58) Field of Search ................................ 370/389, 390, 370/391, 372, 241, 252, 357, 356, 351, 508, 509, 516, 518, 464, 463, 503, 396

(56) References Cited

U.S. PATENT DOCUMENTS

| | | | | |
|---|---|---|---|---|
| 4,926,418 | A | | 5/1990 | Cidon et al. ................ 370/85.5 |
| 5,455,701 | A | * | 10/1995 | Eng et al. ...................... 398/54 |
| 5,623,483 | A | * | 4/1997 | Agrawal et al. ............. 370/253 |
| 5,870,562 | A | * | 2/1999 | Butman et al. .............. 709/238 |
| 5,896,388 | A | * | 4/1999 | Earnest ..................... 370/230.1 |
| 6,240,514 | B1 | * | 5/2001 | Inoue et al. ................. 713/153 |
| 6,246,701 | B1 | * | 6/2001 | Slattery ....................... 370/503 |
| 6,272,132 | B1 | * | 8/2001 | Ofek et al. .................. 370/389 |
| 6,330,236 | B1 | * | 12/2001 | Ofek et al. .................. 370/369 |
| 6,377,579 | B1 | * | 4/2002 | Ofek ........................ 370/395.4 |
| 6,385,198 | B1 | * | 5/2002 | Ofek et al. .................. 370/389 |
| 6,442,135 | B1 | * | 8/2002 | Ofek .......................... 370/229 |

OTHER PUBLICATIONS

R.W. Kembel, "The FibreChannel Consultant: Arbitrated Loop", Connectivity Solutions, Tucson, AZ, Chapters 1 and 2, pp. 1–47.

W. Stallings, "ISDN An Introduction", MacMilliam Publishing Co., NY (1989), pp. 119122.–.

P. Dana, "Global Positioning System (GPS) Time Dissemination for Real–Time Applications", Real–Time Systems, 12, 9–40 (1997), Kluwer Academic Publishers, Boston, MA, pp 940–.

A. Jocob, "A Survey of Fast Packet Switches", Computer Committee Review, IEEE, Jan. 1990, pp. 54–64.

A.G. Fraser, "Early Experiments with Asynchronous Time Division Networks", IEEE Networks, Jan. 1993, pp 12–26.

M. Hamdi et al., "Voice Service Interworking for PSTN and IP Networks", IEEE Communications Magazine, May 1999, pp 104–111.

(List continued on next page.)

*Primary Examiner*—Douglas Olms
*Assistant Examiner*—Ricardo M. Pizarro
(74) *Attorney, Agent, or Firm*—Sitrick & Sitrick

(57) ABSTRACT

The invention describes a method for transmitting and forwarding data packets over a packet switching and shared media networks. The switches of the network maintain a common time reference (CTR), which is obtained either from an external source (such as GPS—Global Positioning System) or is generated and distributed internally. The time intervals are arranged in simple periodicity and complex periodicity (like seconds and minutes of a clock). The present invention provides for synchronous switches to be accessed by end-stations that are located on a shared media network. The shared media network can be of various types, including but not limited to: IEEE P1394 and Ethernet for desktop computers and room area networks, cable modem head-end (e.g., DOCSIS, IEEE 802.14), wireless base-station (e.g., IEEE 802.11), and Storage Area Network (SAN) (e.g., FC-AL, SSA). The end-station can be of corresponding various types including but not limited to: for IEEE 1394: video cameras, VCR and video disk, for cable modem: set-top box with multiple Ethernet connections to video cameras, VCRs, and for wireless: desktop computers and mobile units, and for SAN; disk drives, tape drives, RAM disks, electronic disks, and other storage devices.

72 Claims, 21 Drawing Sheets

OTHER PUBLICATIONS

J.C. Bellamy, "Digital Network Synchronization", IEEE Communications Magazine, Apr. 1995, pp. 70–83.

E.W. Zegura, "Architectures for ATM Switching Systems", IEEE Communications Magazine, Feb. 1993, pp. 28–37.

A. Pattavina, "Nonblocking Architectures for ATM Switching", IEEE Communication Magazine, Feb. 1993, pp. 38–48.

*Serial Storage Architecture A Technology Overview*, version 3.0, SSA Industry Association 1995, pp. 1–43.

Y. Ofek, "Overview of the MetaRing Architecture", *Computer Networks and ISDN Systems*, vol. 26 (1994), pp. 817–829.

M. Baldi, et al., "End–to–End Delay Analysis of Videoconferencing Over Packet Switched Networks", IEEE Infocom, Jan. 29, 1998, Title page and pp. 1–27.

S.J.Golestani, "A Framing Strategy for Congestion Management", *IEEE Journal on Selected Areas in Communications*, vol. 9, No. 7, Sep. 1991, pp. 1064–1077.

Li et al., "Pseudo–isonchronous Cell Forwarding", *Computer Networks and ISDN Systems*, vol. 30 (1998), pp. 2359–2372.

* cited by examiner

| 4B/5B encoding scheme | | |
|---|---|---|
| HEX DATA | 4-bit Binary Data | 5-bit Encoded Data Codeword |
| 0 | 0000 | 11110 |
| 1 | 0001 | 01001 |
| 2 | 0010 | 10100 |
| 3 | 0011 | 10101 |
| 4 | 0100 | 01010 |
| 5 | 0101 | 01011 |
| 6 | 0110 | 01110 |
| 7 | 0111 | 01111 |
| 8 | 1000 | 10010 |
| 9 | 1001 | 10011 |
| A | 1010 | 10110 |
| B | 1011 | 10111 |
| C | 1100 | 11010 |
| D | 1101 | 11011 |
| E | 1110 | 11100 |
| F | 1111 | 11101 |

| 4B/5B encoding scheme | | |
|---|---|---|
| Control Input | | 10-bit Encoded Control Codeword |
| HEX DATA | Binary Data | |
| 1 | 0001 | 11111 11111 |
| 2 | 0010 | 01101 01101 |
| 3 | 0011 | 01101 11001 |
| 4 | 0100 | 11111 00100 |
| 5 | 0101 | 01101 00111 |
| 6 | 0110 | 11001 00111 |
| 7 | 0111 | 11001 11001 |
| 8 | 1000 | 00100 00100 |
| 9 | 1001 | 00100 11111 |
| A | 1010 | 00100 00000 |
| B | 1011 | 00111 00111 |
| C | 1100 | 00111 11001 |
| D | 1101 | 00000 00100 |
| E | 1110 | 00000 11111 |
| F | 1111 | 00000 00000 |

FIG. 6B P1/P2, M1 values

P1/P2=00 - CBR – constant bit rate
P1/P2=01 - VBR – variable bit rate
P1/P2=10 - "Best Effort"
P1/P2=11 - Rescheduled data packet M1=0 - point-to-point packet (one destination)
M1=1 - multicast packet (multiple destinations)

FIG. 18A  Request message

| Sender ID | Device ID | Device type | Resource description | Request Description |
|---|---|---|---|---|

FIG. 18B  Schedule message

| Sender ID | Device ID | Device type | Schedule description: $(t_1/s_1)\ (t_2/s_2)\ (t_3/s_3)\ ...\ (t_k/s_k)$ |
|---|---|---|---|

$t_k$ - the number of time frame in the time cycle or super cycle for transmission over the first SVP link
$s_k$ - the number of bytes that can be transmitted in that time frame over the first SVP link This following set $(t_1/s_1)\ (t_2/s_2)\ (t_3/s_3)\ ...\ (t_k/s_k)$ can define various schedules including *complex schedule*

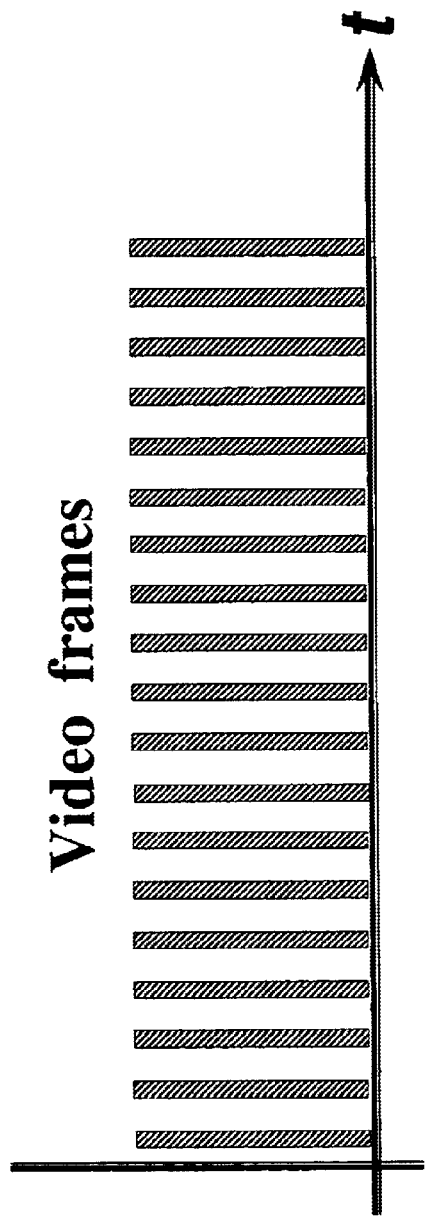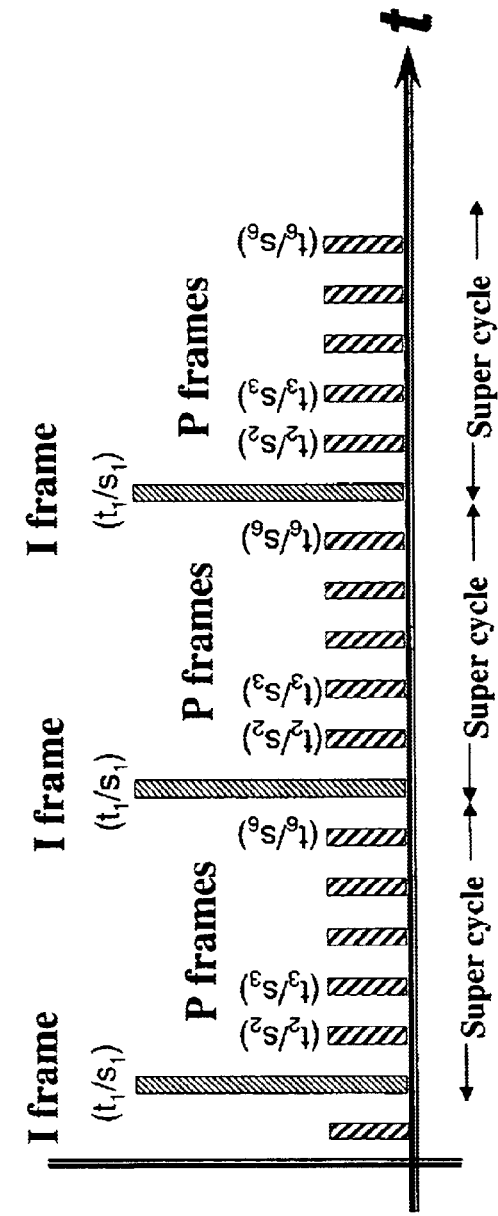
FIG. 21A
FIG. 21B

US 6,754,210 B1

SHARED MEDIUM ACCESS SCHEDULING WITH COMMON TIME REFERENCE

RELATED APPLICATIONS

This application is a continuation of patent application Ser. No. 09/120,636, filed Jul. 22, 1998, which is a continuation of provisional application serial No. 60/088,983 filed Jun. 11, 1998.

FEDERALLY SPONSORED RESEARCH OR DEVELOPMENT

Not Applicable.

BACKGROUND OF THE INVENTION

This invention relates to generally to a method and apparatus for transmitting of data on a communications network. More specifically, this invention relates to timely forwarding and delivery of data over the network and to their destination nodes. Consequently, the end-to-end performance parameters, such as, loss, delay and jitter, have either deterministic or probabilistic guarantees.

The proliferation of high-speed communications links, fast processors, and affordable, multimedia-ready personal computers brings about the need for wide area networks that can carry real time data, like telephony and video. However, the end-to-end transport requirements of real-time multimedia applications present a major challenge that cannot be solved satisfactorily by current networking technologies. Such applications as video teleconferencing, and audio and video group (many-to-many) multicasting generate data at a wide range of bit rates and require predictable, stable performance and strict limits on loss rates, end-to-end delay bounds, and delay variations ("jitter"). These characteristics and performance requirements are incompatible with the services that current circuit and packet switching networks can offer.

Circuit-switching networks, which are still the main carrier for real-time traffic, are designed for telephony service and cannot be easily enhanced to support multiple services or carry multimedia traffic. Its synchronous byte switching enables circuit-switching networks to transport data streams at constant rates with little delay and jitter. However, since circuit-switching networks allocate resources exclusively for individual connections, they suffer from low utilization under "bursty" traffic. Moreover, it is difficult to dynamically allocate circuits of widely different capacities, which makes it a challenge to support multimedia traffic. Finally, the synchronous byte switching of SONET, which embodies the Synchronous Digital Hierarchy (SDH), requires increasingly more precise clock synchronization as the lines speed increases [John C. Bellamy, *Digital Network Synchronization*, IEEE Communications Magazine, April 1995, pages 70–83].

Packet switching networks like IP (Internet Protocol)-based Internet and Intranets [see, for example, A. Tannebaum, *Computer Networks* (3rd Ed) Prentice Hall, 1996] and ATM (Asynchronous Transfer Mode) [see, for example, Handel et al., *ATM Networks: Concepts, Protocols, and Applications*, (2nd Ed.) Addison-Wesley, 1994] handle bursty data more efficiently than circuit switching, due to their statistical multiplexing of the packet streams. However, current packet switches and routers operate asynchronously and provide best effort service only, in which end-to-end delay and jitter are neither guaranteed nor bounded. Furthermore, statistical variations of traffic intensity often lead to congestion that results in excessive delays and loss of packets, there by significantly reducing the fidelity of real-time streams at their points of reception.

Efforts to define advanced services for both IP and ATM have been conducted in two levels: (1) definition of service, and (2) specification of methods for providing different services to different packet streams. The former defines interfaces, data formats, and performance objectives. The latter specifies procedures for processing packets by hosts and switches/routers. The types of services that defined for ATM include constant bit rate (CBR), variable bit rate (VBR) and available bit rate (ABR).

The methods for providing different services under packet switching fall under the general title of Quality of Service (QoS). Prior art in QoS can be divided into two parts: (1) traffic shaping with local timing without deadline scheduling, for example, [Demers et al., *Analysis and Simulation Of A Fair Queuing Algorithm*, ACM Computer Communication Review (SIGCOMM'89), pages 3–12, 1989; S. J. Golestani, *Congestion-Free Communication In High-Speed Packet Networks*, IEEE Transcripts on Communications, COM-39(12):1802–1812, December 1991; Parekh et al., *A Generalized Processor Sharing Approach To Flow Control—The Multiple Node Case*, IEEE/ACM T. on Networking, 2(2):137–150, 1994], and (2) traffic shaping with deadline scheduling, for example [Ferrari et al., *A Scheme For Real-Time Channel Establishment In Wide-Area Networks*, IEEE Journal on Selected Areas in Communication, SAC-8(4):368–379, April 1990]. Both of these QoS approaches rely on manipulation of local queues by each router with little or no coordination with other routers. These approaches have inherent limitations when used to transport real-time streams. When traffic shaping without deadline scheduling is configured to operate at high utilization with no loss, the delay and jitter are inversely proportional to the connection bandwidth, which means that low rate connections may experience large delay and jitter inside the network. In traffic shaping with deadline scheduling the delay and jitter are controlled at the expense of possible congestion and loss.

The real-time transport protocol (RTP) [H. Schultzrinne et. al, RTP: *A Transport Protocol for Real-Time Applications*, IETF Request for Comment RFC 889, January 1996] is a method for encapsulating time-sensitive data packets and attaching to the data time related information like time stamps and packet sequence number. RTP is currently the accepted method for transporting real time streams over IP internetworks and packet audio/video telephony based on ITU-T H.323.

One approach to an optical network that uses synchronization was introduced in the synchronous optical hypergraph [Y. Ofek, *The Topology, Algorithms And Analysis Of A Synchronous Optical Hypergraph Architecture*, Ph.D. Dissertation, Electrical Engineering Department, University of Illinois at Urbana, Report No. UIUCDCS-R-87-1343, May 1987], which also relates to how to integrate packet telephony using synchronization [Y. Ofek, *Integration Of Voice Communication On A Synchronous Optical Hypergraph*, INFOCOM'88, 1988]. In the synchronous optical hypergraph, the forwarding is performed over hyperedges, which are passive optical stars. In [Li et al., *Pseudo-Isochronous Cell Switching In ATM Networks*, IEEE INFOCOM'94, pages 428–437, 1994; Li et al., *Time-Driven Priority: Flow Control For Real-Time Heterogeneous Internetworking*, IEEE INFOCOM'96, 1996] the synchronous optical hypergraph idea was applied to networks with an arbitrary topology and with point-to-point links. The two papers [Li et al., *Pseudo-Isochronous Cell Switching In ATM Networks*, IEEE INFOCOM'94, pages 428–437, 1994; Li et al., *Time-Driven Priority: Flow Control For Real-Time Heterogeneous Internetworking*, IEEE INFOCOM'96, 1996] provide an abstract (high level) description of what is called "RISC-like forwarding", in which a packet is forwarded, with little if any details, one hop every time frame in a manner similar to the execution of instructions in a Reduced Instruction Set Computer (RISC) machine.

Another related paper is [Baldi et al., *End-to-End Delay Analysis of Videoconferencing Over Packet Switched Networks*, IEEE INFOCOM 1998] which is a comparitive study of videoconferencing over Time-Driven Priority and various other packet-switched networks.

SUMMARY OF THE INVENTION

In accordance with the present invention, a method is disclosed providing virtual pipes that carry real-time traffic over packet switching networks while guaranteeing end-to-end performance. The method combines the advantages of both circuit and packet switching. It provides for allocation for the exclusive use of predefined connections and for those connections it guarantees loss free transport with low delay and jitter. When predefined connections do not use their allocated resources, other non-reserved data packets can use them without affecting the performance of the predefined connections.

Under the aforementioned prior art methods for providing packet switching services, switches and routers operate asynchronously. The present invention provides real-time services by synchronous methods that utilize a time reference that is common to the switches and end stations comprising a wide area network. The common time reference can be realized by using UTC (Coordinated Universal Time), which is globally available via, for example, GPS (Global Positioning System—see, for example: [Peter H. Dana, *Global Positioning System (GPS) Time Dissemination for Real-Time Applications*, Real-Time Systems, 12, pp. 9–40, 1997]. By international agreement, UTC is the same all over the world. UTC is the scientific name for what is commonly called GMT (Greenwich Mean Time), the time at the 0 (root) line of longitude at Greenwich, England. In 1967, an international agreement established the length of a second as the duration of 9,192,631,770 oscillations of the cesium atom. The adoption of the atomic second led to the coordination of clocks around the world and the establishment of UTC in 1972. The Time and Frequency Division of the National Institute of Standards and Technologies (NIST) (see http://www.boulder.nist.gov/timefreq) is responsible for coordinating UTC with the International Bureau of Weights and Measures (BIPM) in Paris.

UTC timing is readily available to individual PCs through GPS cards. For example, TrueTime, Inc.'s (Santa Rosa, Calif.) PCI-SG product provides precise time, with zero latency, to computers that have PCI extension slots. Another way by which UTC can be provided over a network is by using the Network Time Protocol (NTP) [D. Mills, *Network Time Protocol* (version 3) IETF RFC 1305]. However, the clock accuracy of NTP is not adequate for inter-switch coordination, on which this invention is based.

In accordance with the present invention, the synchronous virtual pipes (SVPs) are accessed by end-stations that are located across a shared media network. The shared media network can be of various types: IEEE P1394 and Ethernet for desktop computers and room area networks, cable modem head-end (e.g., DOCSIS, IEEE 802.14), wireless base-station (e.g., IEEE 802.11), and Storage Area Network (SAN) (e.g., FC-AL, SSA). The end-station can be of corresponding various types: for IEEE 1394: video cameras, VCR and video disk; for cable modem: set-top box with multiple Ethernet connections to video cameras, VCRs; for wireless: desktop computers and mobile units; and for SAN: disk drives, tape drives, RAM disks, electronic disks, and other storage devices.

More specifically:

IEEE P1394 [P1394 *Standard for a High Performance Serial Bus*, IEEE P1394 Draft 8.0v4, Nov. 21, 1995]— This standard describes a high speed, low cost serial bus suitable for use as a peripheral bus or a backup to parallel back-plane buses.

DOCSIS [*Data-Over-Cable Service Interface Specifications Radio Frequency Interface Specification*, SP-RFI-I04-980724]. The goal of this specification is to enable cable operators to deploy high-speed data communications systems on cable television systems. It provides definition, design, development and deployment of data-over-cable systems on an uniform, consistent, open, non proprietary, multi-vendor interoperable basis. The intended service will allow transparent bi-directional transfer of Internet Protocol (IP) traffic, between the cable system head-end and customer locations, over an all-coaxial or hybrid fiber/coax (HFC) cable network.

IEEE 802.14 [*IEEE 802.14/a Draft 3 Revision 2 for Cable-TV access method and physical layer specification*, Aug. 1, 1998], this standard is intended to provide complete support of Asynchronous Transfer Mode (ATM). This support comprises supporting the following: (1) The ATM layer service, as defined in ITU-T Recommendation I.150, (2) Transport of ATM cells across the HFC MAC, (3) The five ATM Service Categories defined in the ATM Forum Traffic Management specification, along with their associated Quality-of Service and traffic contract parameters, (4) Point-to-point and unidirectional point-to-multipoint ATM virtual connection links, (5) ATM Virtual Path (VP) and Virtual Channel (VC) links which are concatenated with other VP- and/or VC-links to form VP connections or VC connections, (6) Permanent Virtual Connections (PVCs) and Switched Virtual Connections (SVCs), including support for the ATM Forum Signaling 4.0 specification for establishing and releasing SVCs and the Integrated Layer Management Interface (formerly, Interim Layer Management Interface).

IEEE 802.11 [*Wireless LAN Medium Access Control (MAC) and Physical Layer (PHY) specifications*, IEEE Std 802.11–1997]—the medium access control (MAC) and physical characteristics for wireless local area networks (LANs) are specified in this standard, part of a series of standards for local and metropolitan area networks. The medium access control unit in this standard is designed to support physical layer units as they may be adopted dependent on the availability of spectrum. This standard contains three physical layer units: two radio units, both operating in the 2400–2500 MHz band, and one base-band infrared unit. One radio unit employs the frequency-hopping spread spectrum technique, and the other employs the direct sequence spread spectrum technique.

There are several variants of Storage Area Network (SAN), for example: (1) ANSI standard X3T11, FC-AL— Fiber Channel Arbitrated Loop [see, for example, Robert W.

Kembel, *Arbitrated Loop*, Connectivity Solutions, 1997], and (2) ANSI standard X3T10, SSA—Serial Storage Architecture [see, for example, *Serial Storage Architecture A Technology Overview, Version* 3.0, SSA Industry Association 1995]. SAN provides connectivity for a wide variety of storage devices, such as, disk drives, tape drives, RAM disks, electronic disks, and other storage devices. The underlying network for SSA is a ring network with concurrent access and spatial bandwidth reuse [Y. Ofek, *Overview of the MetaRing Architecture*, Computer Networks and ISDN Systems, Vol. 26, Nos. 6–8, March 1994, pp. 817–830], thus, a plurality of end-stations can send data packets to this type shared media network at the same time.

Fiber Channel (FC)—ANSI X3T11, using the arbitrated loop (AL) topology (abbreviated FC-AL) as a replacement for Small Computer Storage Interface (SCSI). Serial Storage Architecture (SSA) is a standard for peripheral interconnections, bringing with it higher levels of performance, availability, fault tolerance, and connectivity at low cost. FC-AL and SSA are high performance serial interfaces designed to connect disk drives, optical drives, tape drives, CD-ROMs, printers, scanners, and other peripherals to personal computers, workstations, servers, and storage subsystems. SSA and FC-AL facilitate migration from current SCSI equipment and will accommodate implementation of future configurations, including the use of fiber-optic connections.

These and other aspects and attributes of the present invention will be discussed with reference to the following drawings and accompanying specification.

BRIEF DESCRIPTION OF THE DRAWINGS

FIG. 6B is an illustration in detail of specific fields in the header of FIG. 6A;

FIG. 18A is an illustration of the types and organization of data contained within the request messages in one embodiment of the present invention;

FIG. 18B is an illustration of the types and organization of data contained within the schedule messages in one embodiment of the present invention;

FIG. 21A is a timing diagram illustrating the constant data rate requirements of a data stream having simple isochronous periodicity; and FIG. 21B is a timing diagram illustrating the varying data rate requirements of a data stream having complex isochronous periodicity.

DETAILED DESCRIPTION OF THE PREFERRED EMBODIMENT

Figure 1:
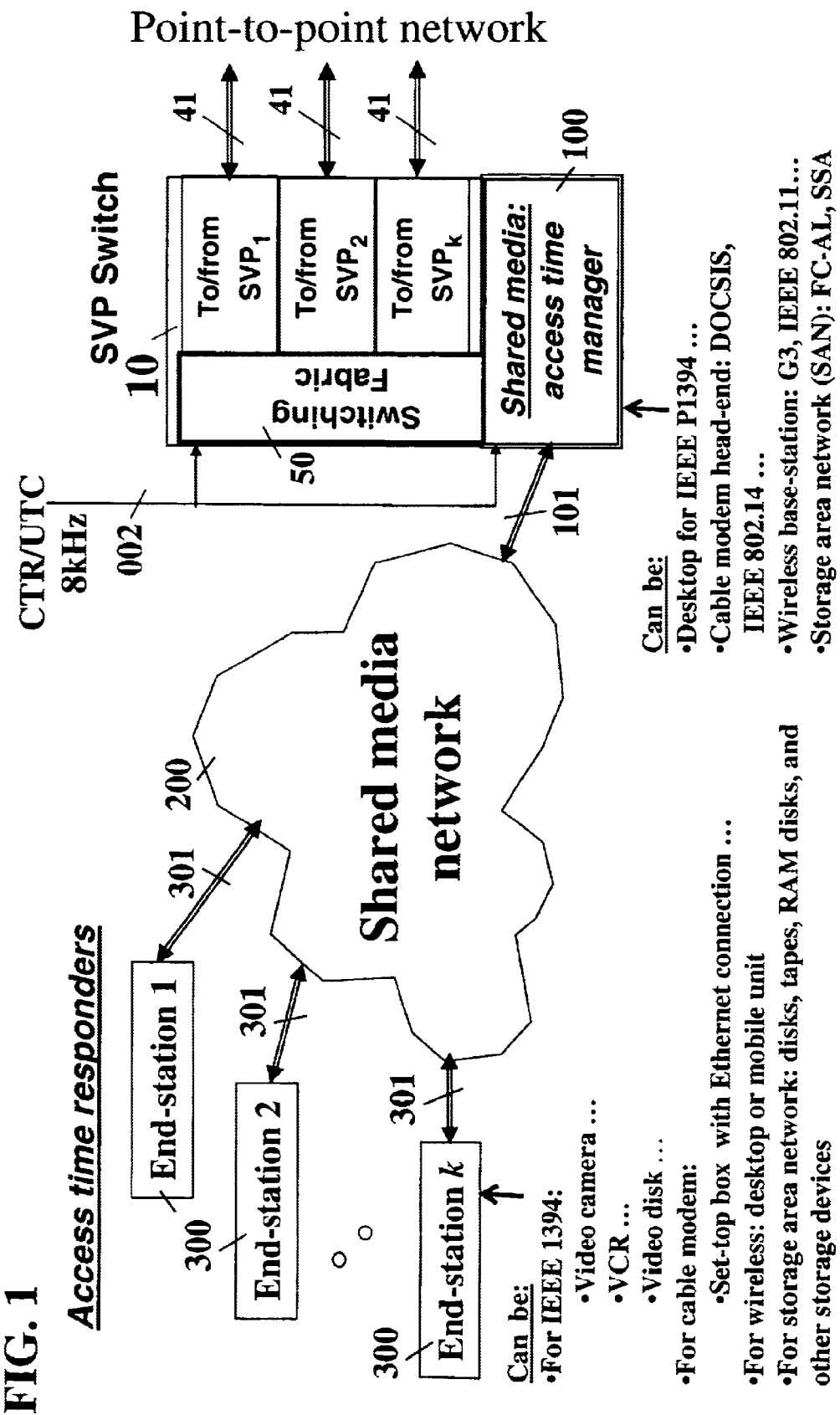
FIG. 1 is a schematic block diagram of the shared media network of the present invention.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

The present invention relates to a system and method for transmitting and forwarding data packets over a packet switching network. The switches of the network maintain a common time reference, which is obtained either from an external source (such as GPS—Global Positioning System) or is generated and distributed internally. The common time reference is used to define time intervals, which include time super-cycles, time cycles, time frames, time slots, and other kinds of time intervals. The time intervals are arranged both in simple periodicity and complex periodicity (like seconds and minutes of a clock).

A data packet that arrives to an input port of a switch, is switched to an output port based on specific routing information in the data packet's header (e.g., IPv4 destination address in the Internet, VCI/VPI labels in ATM). Each switch along a route from a source to a destination forwards data packets in periodic time intervals that are predefined using the common time reference.

A time interval duration can be longer than the time duration required for communicating a data packet, in which case the exact position of a data packet in the time interval is not predetermined. A data packet is defined to be located within the time interval which contains the communication of the first bit of the data packet, even if the length of the data packet is sufficiently long to require multiple time intervals to communicate the entire data packet.

Data packets that are forwarded inside the network over the same route and in the same periodic time intervals constitute a virtual pipe and share the same pipe identification (i.e., pipe ID or PID). A PID can be either explicit, such as a tag or a label that is generated inside the network, or implicit such as a group of IP addresses. A virtual pipe can be used to transport data packets from multiple sources and to multiple destinations. The time interval in which a switch forwards a specific data packet is determined by the data packet's PID, the time it reaches the switch, and the current value of the common time reference.

A virtual pipe provides deterministic quality of service guarantees. In accordance with the present invention, congestion-free data packet switching is provided for pipe-IDs (PIDs) in which capacity in their corresponding forwarding links and time intervals is reserved in advance. Furthermore, data packets that are transferred over a virtual pipe reach their destination in predefined time intervals, which guarantees that the delay jitter is smaller than or equal to one time interval.

Data packets that are forwarded from one source to multiple destinations share the same pipe ID and the links and time intervals on which they are forwarded comprise a virtual tree. This facilitates congestion-free forwarding from one input port to multiple output ports, and consequently, from one source to multiplicity of destinations. Data packets that are destined to multiple destinations reach all of their destinations in predefined time intervals and with delay jitter that is no larger than one time interval.

A system is provided for managing data transfer of data packets from a source to a destination. The transfer of the data packets is provided during a predefined time interval, comprised of a plurality of predefined time frames. The system is further comprised of a plurality of switches. A virtual pipe is comprised of at least two of the switches interconnected via communication links in a path. A common time reference signal is coupled to each of the switches, and a time assignment controller assigns selected predefined time frames for transfer into and out from each of the respective switches responsive to the common time reference signal. Each communications link may use a different time frame duration generated from the common time reference signal.

For each switch, there is a first predefined time frame within which a respective data packet is transferred into the respective switch, and a second predefined time frame within which the respective data packet is forwarded out of the respective switch, wherein the first and second predefined time frames may have different time intervals and wherein both the first and second predefined time frames are predetermined. The time assignment provides consistent fixed intervals between the time between the input to and output from the virtual pipe.

In a preferred embodiment, there is a predefined subset of the predefined time frames during which the data packets are transferred in the switch, and for each of the respective switches, there are a predefined subset of the predefined time frames during which the data packets are transferred out of the switch.

Each of the switches is comprised of one or a plurality of addressable input and output ports. A routing controller maps each of the data packets that arrives at each one of the input ports of the respective switch to a respective one or more of the output ports of the respective switch.

For each of the data packets, there is an associated time of arrival to a respective one of the input ports. The time of arrival is associated with a particular one of the predefined time frames. For each of the mappings by the routing controller, there is an associated mapping by a scheduling controller, which maps of each of the data packets between the time of arrival and forwarding time out. The forwarding time out is associated with a specified predefined time frame.

In the preferred embodiment, there are a plurality of the virtual pipes comprised of at least two of the switches interconnected via communication links in a path. The communication link is a connection between two adjacent switches; and each of the communications links can be used simultaneously by at least two of the virtual pipes. Multiple data packets can be transferred utilizing at least two of the virtual pipes.

In some configurations of this invention there is a fixed time difference, which is constant for all switches, between the time frames for the associated time of arrival and forwarding time out for each of the data packets. The fixed time difference is a variable time difference for some of the switches. A redefined interval is comprised of a fixed number of contiguous time frames comprising a time cycle. Data packets that are forwarded over a given virtual pipe are forwarded from an output port within a predefined subset of time frames in each time cycle. Furthermore, the number of data packets that can be forwarded in each of the predefined subset of time frames for a given virtual pipe is also predefined.

The time frames associated with a particular one of the switches within the virtual pipe are associated with the same switch for all the time cycles, and are also associated with one of input into or output from the particular respective switch.

In some configurations of this invention there is a constant fixed time between the input into and output from a respective one of the switches for each of the time frames within each of the time cycles. A fixed number of contiguous time cycles comprise a super-cycle, which is periodic. Data packets that are forwarded over a given virtual pipe are forwarded from an output port within a predefined subset of time frames in each super-cycle. Furthermore, the number of data packets that can be forwarded in each of the predefined subset of time frames within a super-cycle for a given virtual pipe is also predefined.

In the preferred embodiment the common time reference signal is coupled from a GPS (Global Positioning System), and is in accordance with the UTC (Coordinated Universal Time) standard. The UTC time signal does not have to be received directly from GPS. Such signal can be received by using various means, as long as the delay or time uncertainty associated with that UTC time signal does not exceed half a time frame.

In one embodiment, the super-cycle duration is equal to one second as measured using the UTC (Coordinated Universal Time) standard. In an alternate embodiment the super-cycle duration spans multiple UTC seconds. In another alternate embodiment the super-cycle duration is a fraction of a UTC second. In the most preferred embodiment, the super-cycle duration is a small integer number of UTC seconds.

A select buffer controller maps one of the time frames for output from a first switch to a second time frame for input via the communications link to a second switch. The select buffer controller uses the UTC time signal in order to identify the boundaries between two successive time frames. The select buffer controller inserts a time frame delimiter (TFD) signal into the transmission link in order to the signal the second switch with the exact boundary between two time frames.

Each of the data packets is encoded as a stream of data, and a time frame delimiter is inserted into the stream of data responsive to the select buffer controller. This can be implemented by using a redundant serial codewords as it is later explained.

The communication links can be of fiber optic, copper, and wireless communication links for example, between a ground station and a satellite, and between two satellites orbiting the earth. The communication link between two nodes does not have to be a serial communication link A parallel communication link can be used—such link can simultaneously carry multiple data bits, associated clock signal, and associated control signals.

The data packets can be Internet protocol (IP) data packets, and asynchronous transfer mode (ATM) cells, and can be forwarded over the same virtual pipe having an associated pipe identification (PID). The PID can be an Internet protocol (IP) address, Internet protocol group multicast address, an asynchronous transfer mode (ATM), a virtual circuit identifier (VCI), and a virtual path identifier (VPI), or (used in combination as VCI/VPI).

The routing controller determines two possible associations of an incoming data packet: (i) the output port, and (ii) the time of arrival (ToA). The ToA is then used by the scheduling controller for determining when a data packet should be for forwarded by the select buffer controller to the next switch in the virtual pipe. The routing controller utilizes at least one of Internet protocol version 4 (IPv4), Internet protocol version 6 (IPv6) addresses, Internet protocol group multicast address, Internet MPLS (multi protocol label swapping or tag switching) labels, ATM virtual circuit identifier and virtual path identifier (VCI/VPI), and IEEE 802 MAC (media access control) addresses, for mapping from an input port to an output port.

In a preferred embodiment, each of the data packets is comprised of a header, which includes an associated time stamp. For each of the mappings by the routing controller, there is an associated mapping by the scheduling controller, of each of the data packets between the respective associated time-stamp and an associated forwarding time out, which is associated with one of the predefined time frames. The time stamp can record the time in which a data packet was created by its application.

In one embodiment the time-stamp is generated by an Internet real-time protocol (RTP), and by a predefined one of the switches. The time-stamp can be used by a scheduling controller in order to determine the forwarding time of a data packet from an output port.

Each of the data packets originates from an end station, and the time-stamp is generated at the respective end station for inclusion in the respective originated data packet Such generation of a time-stamp can be derived from UTC either by receiving it directly from GPS or by using the Internet's Network Time Protocol (NTP). The time stamp can alternatively be generated at the PT sub-network boundary, which is the point at which the data enters the synchronous virtual pipe.

In accordance with the present invention, a system is provided for transferring data packets across a data network while maintaining for reserved data traffic constant bounded jitter (or delay uncertainty) and no congestion-induced loss of data packets. Such properties are essential for many multimedia applications, such as, telephony and video teleconferencing.

In accordance with the design, method, and illustrated implementation of the present invention, one or a plurality of virtual pipes are provided over a data network with general topology. Such data network can span the globe. Each virtual pipe 25 is constructed over one or more switches 10, shown in FIG. 3, which are interconnected via communication links 41 in a path.

Figure 3:
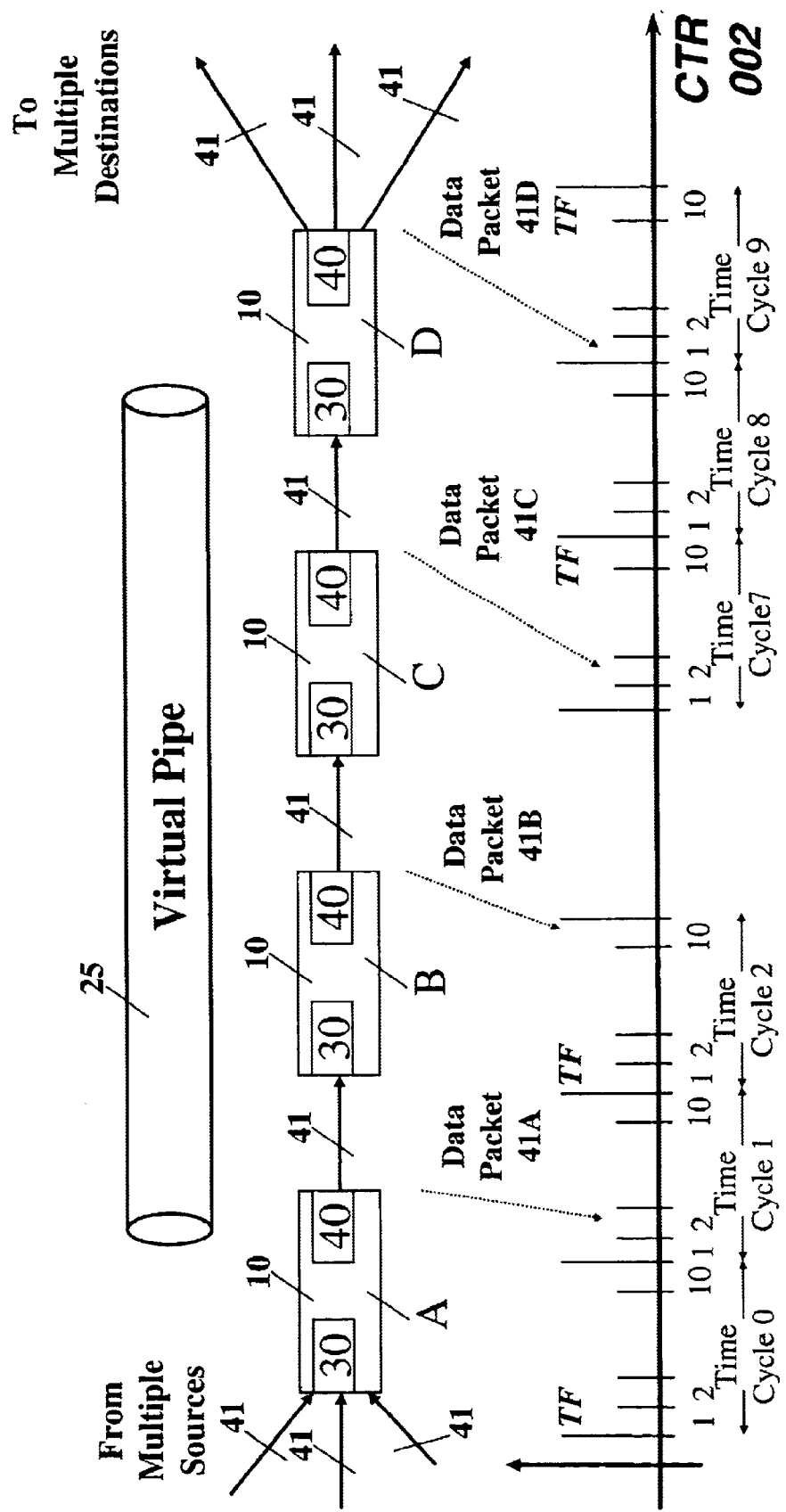
FIG. 3 is a schematic block diagram of a synchronous virtual pipe as used in the present invention.

FIG. 3 illustrates a virtual pipe 25 from the output port 40 of switch A, through switches B and C. The illustrated virtual pipe ends at the output port 40 of node D. The virtual pipe 25 transfers data packets from at least one source to at least one destination.

The data packet transfers over the virtual pipe 25 via switches 10 are designed to occur during a plurality of predefined time intervals, wherein each of the predefined time intervals is comprised of a plurality of predefined time frames. The timely transfers of data packets are achieved by coupling a common time reference signal (not shown) to each of the switches 10.

FIG. 1 illustrates the structure of a shared media network of the present invention. The shared media network access time manager 100 is coupled to an SVP switch 10. The access time manager 100 is also coupled to a shared media network 200 via link 101 and the shared media network 200 is further coupled to end stations 300 by way of end station links 301.

The shared media network 200 may comprise a desktop network standard such as IEEE 1394, marketed by Apple Computer (Cupertino, Calif.) under the tradename Fire Wire and by Sony Corporation (Japan) under the tradename iLink. In this embodiment, the Shared Media Access Time Manager (or SMATM) additionally comprises the functions of an IEEE 1394 master controller. Also in this embodiment, the end-stations 300 each comprise peripheral equipment compatible with the IEEE 1394 standard, each connected to the shared IEEE 1394 physical network via IEEE 1394 cables 301.

In an alternate embodiment, the shared media network 200 may comprise a cable modem network linking geographically distinct sites, such as by way of cable modem standards such as DOCSIS and IEEE 802.14. In this embodiment, the shared media access time manager 100 (SMATM) additionally comprises the functions of a cable modem head-end controller and arbiter. Also in this embodiment, the end stations 300 each comprise cable modem or set-top boxes compatible with the appropriate cable standard, the shared media network 200 comprises a cable tree of communications links, amplifiers, and switches, and the links 301 represent wideband cable leaf connections to the cable tree having the root 101 of the tree coupled to the access time manager 100.

In yet another embodiment, the shared media network 200 may comprise a wireless network linking geographically distinct sites, such as by way of wireless data standards such as G3 and IEEE 802.11. In this embodiment, the shared media access time manager 100 additionally comprises the functions of a wireless base station controller and scheduler. Also in this embodiment, the end stations 300 comprise wireless transceivers, the shared media network 200 and links 301 comprise over-the-air transmission media, and the link 101 represents a physical link from the base station to a transmission center.

In yet another embodiment, the shared media network 200 may comprise an underlying ring network with concurrent access and spatial bandwidth reuse. Over such network plurality of end-stations can send data packets at the same time.

The SVP switch 10 of FIG. 1 is also coupled to one or more synchronous virtual pipes 41 by way of combination input/output ports 30/40. The synchronous virtual pipes 41 can be implemented within an IP network or other kind of network.

The SVP switch 10 of FIG. 1 is further comprised of a GPS receiver 20 linked via a common time reference (CTR) signal 002 to each of the input/output ports 30/40. In this manner, a common time reference is supplied to each of the input ports and each of the output ports within the SVP switch 10. The CTR signal 002 is also coupled to the access time manager 100 as shown in the figure.

Figure 7:
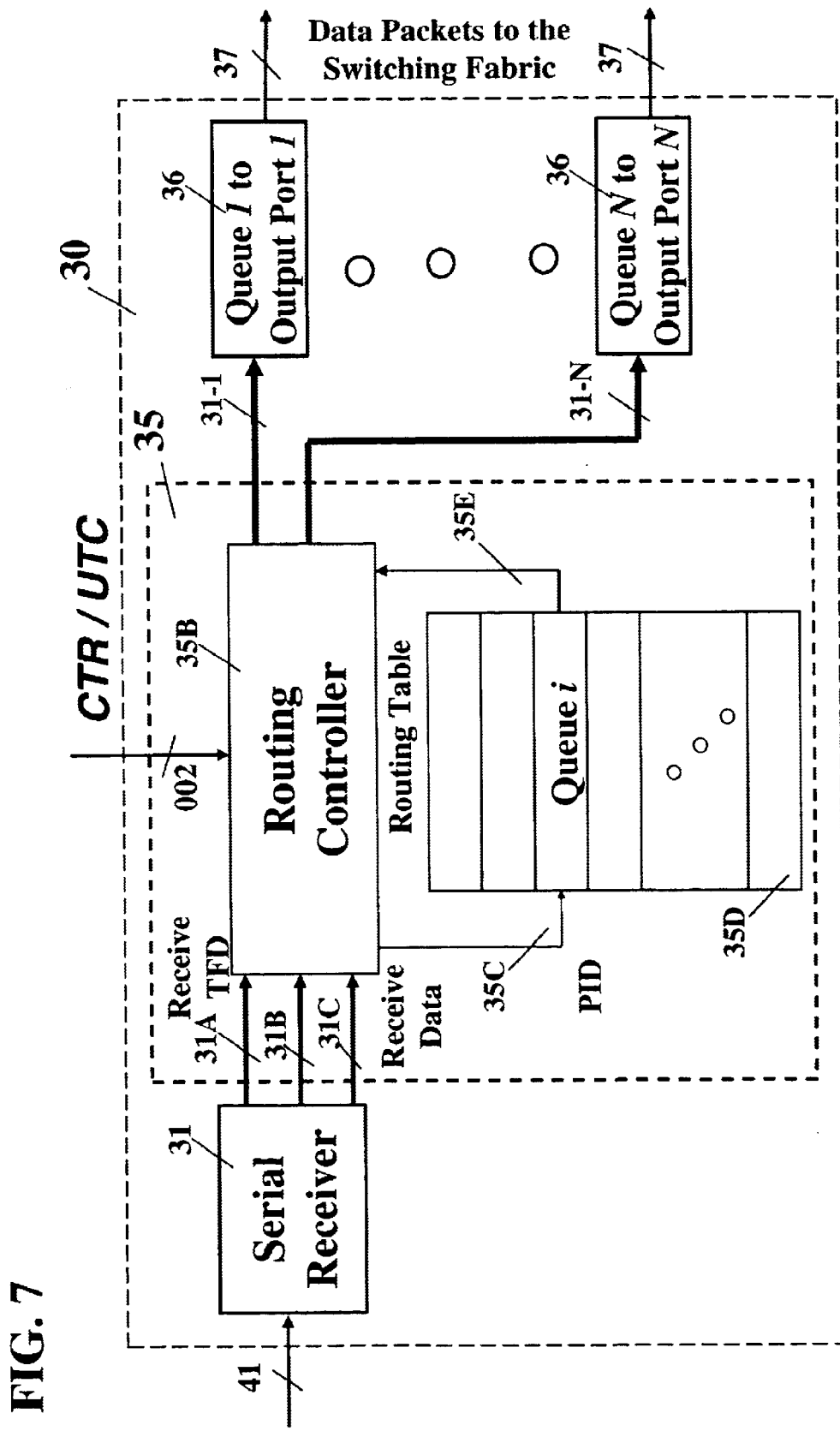
FIG. 7 is a schematic block diagram of an input port of the shared media network of the present invention.
Figure 9:
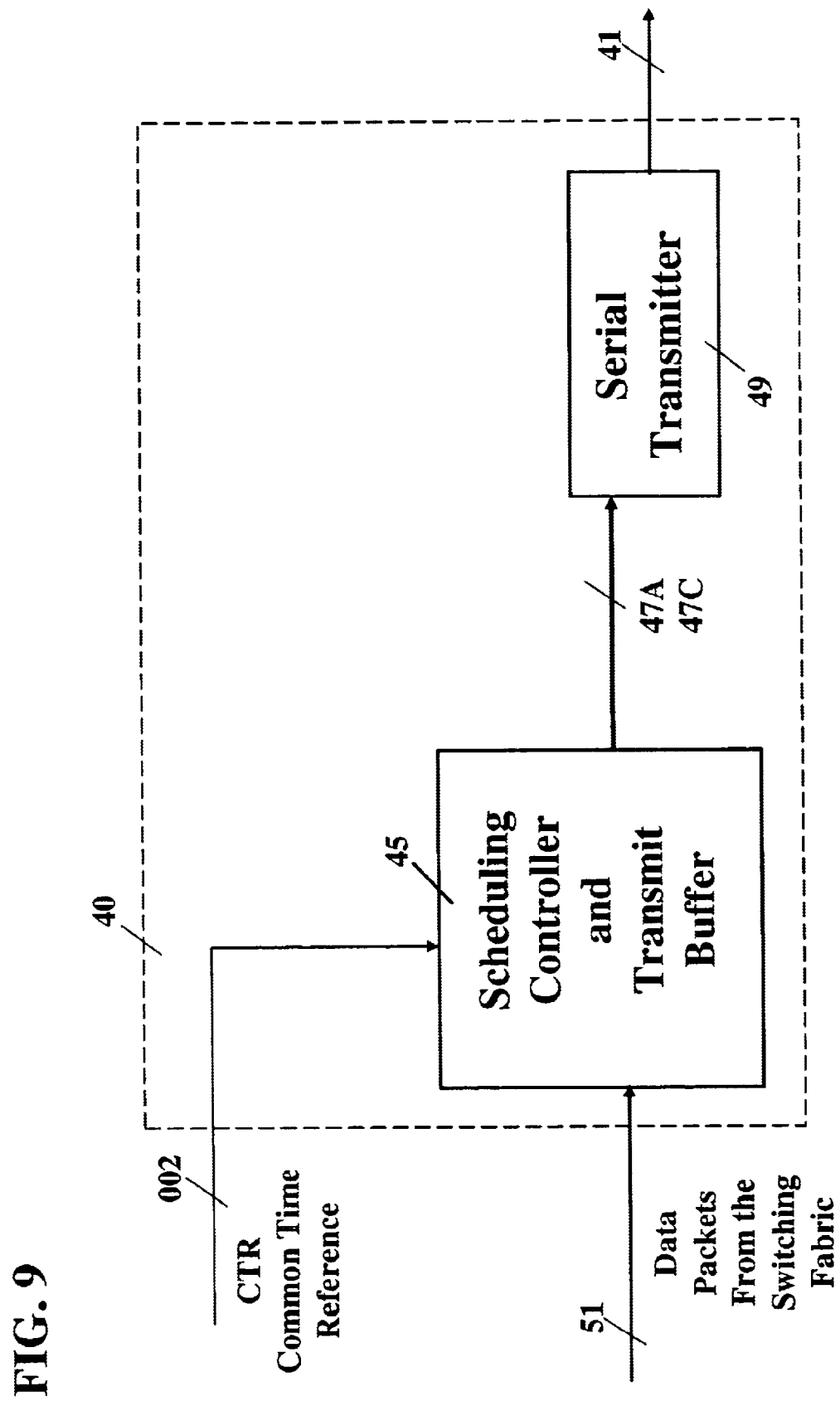
FIG. 9 is a schematic block diagram of an output port of the shared media network of the present invention.
Figure 13:
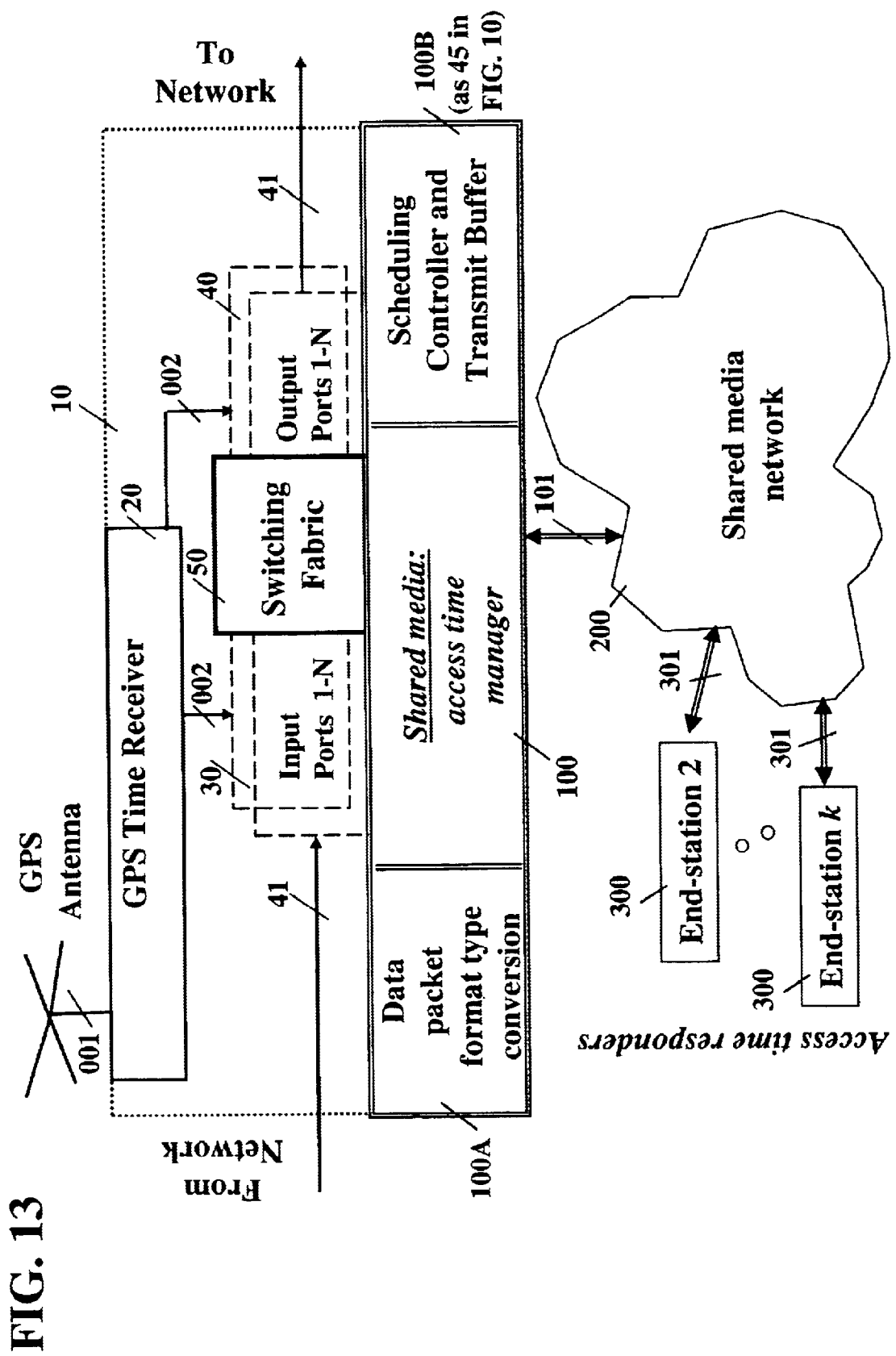
FIG. 13 is a schematic block diagram of an alternate embodiment of the shared media network of the present invention.

FIG. 13 illustrates detail of an alternate embodiment of the shared media access time manager 100 of the present invention. In this embodiment, the SVP switch 10 additionally comprises a switching fabric 50 which is coupled to one or more input ports 30 and one or more output ports 40. Each of the input ports 30 is coupled to the switch fabric 50 via links 37, as shown in FIG. 7. Each of the output ports 40 is coupled to the switch fabric 50 via links 51, as shown in FIG. 9. The switch fabric is inherently coupled and integrated (not shown) to the access time manager 100. Each pair of respective input port 30 and output port 40 comprise an input/output port 30/40. As shown in FIG. 13, the common time reference (CTR) signal 002 is coupled to each input port 30, each output port 40, and to the access time manager 100. The access time manager 100 is also coupled via link 101 to the shared media network 200 (not shown in this figure).

Consecutive time frames are grouped into time cycles. As shown in the example illustrated in FIG. 2, there are 100 time frames in each time cycle. For illustration purposes, the time frames within a time cycle are numbered 1 through 100.

Figure 2:
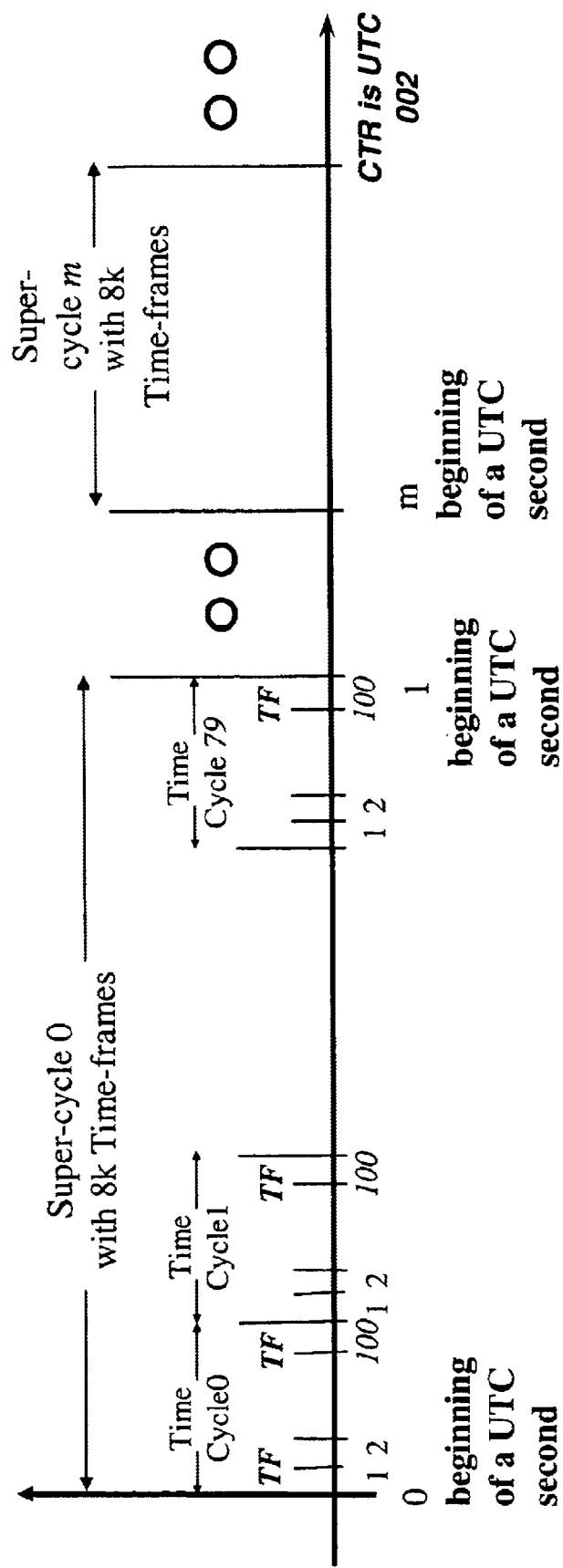
FIG. 2 is a timing diagram relating the common time reference (CTR) that is aligned to UTC and super-cycles, time cycles, and time frames as used in the present invention.

Consecutive time cycles are grouped together into super-cycles, and as shown in FIG. 2, there are 80 time cycles in each super-cycle. For illustration purposes, time cycles within a super-cycle are numbered 0 through 79. Super-cycles 0 and m are shown in FIG. 2.

FIG. 2 is illustrative of the relationship of time frames, time cycles, and super-cycles; in alternate embodiments, the number of time frames within a time cycle may be different than 100, and the number of time cycles within a super-cycle may be different than 80.

FIG. 2 illustrates how the common time reference signal can be aligned with the UTC (Coordinated Universal Time) standard. In this illustrated example the duration of every super-cycle is exactly one second as measured by the UTC standard. Moreover, as shown in FIG. 2, the beginning of each super-cycle coincides with the beginning of a UTC second. Consequently, when leap seconds are inserted or deleted for UTC corrections (due to changes in the earth rotation period) the cycle and super-cycle periodic scheduling will not be affected. The time frames, time cycles, and super-cycles are associated in the same manner with all respective switches within the virtual pipe at all times.

In the embodiment illustrated in FIG. 2, the super-cycle duration is equal to one second as measured using the UTC (Coordinated Universal Time) standard. In an alternate embodiment the super-cycle duration spans multiple UTC seconds. In another alternate embodiment the super-cycle duration is a fraction of a UTC second. In the most preferred embodiment, the super-cycle duration is a small integer number of UTC, seconds.

Pipeline forwarding relates to data packets being forwarded across a virtual pipe 25 with a predefined delay in every stage (either across a communication link 41 or across a switch 10 from input port 30 to output port 40). Data packets enter a virtual pipe 25 from one or more sources and are forwarded to one or more destinations.

Referring again to FIG. 3, the timely pipeline forwarding of data packets over the virtual pipe 25 is illustrated. In this figure, time cycles each contain 10 time frames, and for clarity the super-cycles are not shown. A data packet is received by one of the input ports 30 of switch A at time frame 1, and is forwarded along this virtual pipe 25 in the following manner: (i) the data packet 41A is forwarded from the output port 40 of switch A at time frame 2 of time cycle 1, (ii) the data packet 41B is forwarded from the output port 40 of switch B, after 18 time frames, at time frame 10 of time cycle 2, (iii) the data packet 41C is forwarded from the output port 40 of switch C, after 42 time frames, at time frame 2 of time cycle 7, and (iv) the data packet 41D is forwarded from the output port 40 of switch D, after 19 time frames, at time frame 1 of time cycle 9.

As illustrated in FIG. 3,

All data packets enter the virtual pipe 25 (i.e., forwarded out of the output port 40 of switch A) periodically at the second time frame of a time cycle, are output from this virtual pipe 25 (i.e., are forwarded out of the output port 40 of switch D) after 79 time frames.

The data packets that enter the virtual pipe 25 (i.e., forwarded out of the output port 40 of switch A) can come from one or more sources and can reach switch A over one or more input links 41.

The data packets that exit the virtual pipe 25 (i.e., forwarded out of the output port 40 of switch D) can be forwarded over plurality of output links 41 to one of plurality of destinations.

The data packets that exit the virtual pipe 25 (i.e., forwarded out of the output port 40 of switch D) can be forwarded simultaneously to multiple destinations, (i.e., multicast (one-to-many) data packet forwarding).

The communication link 41 between two adjacent ones of the switches 10 can be used simultaneously by at least two of the virtual pipes.

A plurality of virtual pipes can multiplex (i.e., mix their traffic) over the same communication links.

A plurality of virtual pipes can multiplex (i.e., mix their traffic) during the same time frames and in an arbitrary manner.

The same time frame can be used by multiple data packets from one or more virtual pipes.

For each virtual pipe there are predefined time frames within which respective data packets are transferred into its respective switches, and separate predefined time frames within which the respective data packets are transferred out of its respective switches. Though the time frames of each virtual pipe on each of its switches can be assigned in an arbitrary manner along the common time reference, it is convenient and practical to assign time frames in a periodic manner in time cycles and super-cycles.

The switch 10 structure, as shown in FIG. 3, can also be referred to as a pipeline switch, since it enables a network comprised of such switches to operate as a large distributed pipeline architecture, as it is commonly found inside digital systems and computer architectures.

Figure 4:
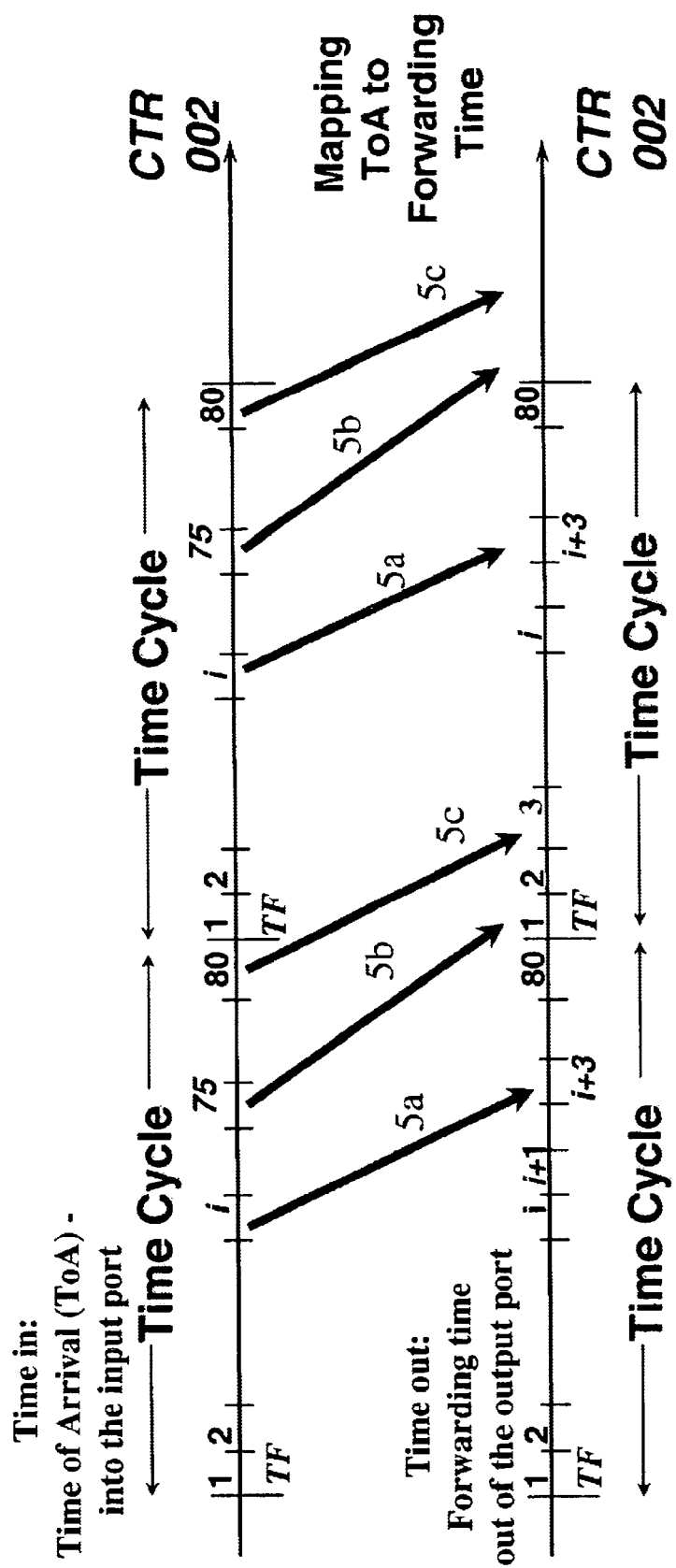
FIG. 4 is a timing diagram illustrating periodic scheduling and forwarding as used in the present invention.

FIG. 4 illustrates the mapping of the time frames into and out of a node on a virtual pipe, wherein the mapping repeats itself in every time cycle, illustrating the time in, which is the time of arrival (ToA), versus the time out, which is the forwarding time out of the output port. FIG. 4 illustrates the periodic scheduling and forwarding timing of a switch of a virtual pipe wherein there are a predefined subset of time frames (i, 75, and 80) of every time cycle, during which data packets are transferred into that switch, and wherein for that virtual pipe there are a predefined subset time frames (i+3, 1, and 3) of every time cycle, during which the data packets are transferred out of that switch.

In the illustrated example of FIG. 4, a first data packet 5a arriving at the input port of the switch at time frame i is forwarded out of the output port of the switch at time frame i+3. In this example the data packet is forwarded out of the output port at a later time frame within the same time cycle in which it arrived. The delay in transiting the switch dts determines a lower bound on the value (i+dts). In the illustrated example, dts must be less than or equal to 3.

Also as shown in FIG. 4, a second data packet 5b arriving at the input port of the switch at time frame 75 is forwarded out of the output port of the switch at time frame 1 within the next time cycle. In this example the data packet is forwarded out of the output port at a earlier numbered time frame but within the next time cycle from which it arrived. Note that data packets in transit may cross time cycle boundaries.

If, for example, each of the three data packets has 125 bytes (i.e. 1000 bits), and there are 80 time frames of 125 microseconds in each time cycle (i.e. a time cycle duration of 10 milliseconds), then the bandwidth allocated to this virtual pipe is 300,000 bits per second. In general, the bandwidth or capacity allocated for a virtual pipe is computed by dividing the number of bits transferred during each of the time cycles by the time cycle duration. In the case of a bandwidth in a super-cycle, the bandwidth allocated to a virtual pipe is computed by dividing the number of bits transferred during each of the super-cycles by the super-cycle duration.

Each pipeline switch 10 is comprised of a plurality of addressable input ports 30 and output ports 40. As illustrated in FIG. 7, the input port 30 is further comprised of a routing controller 35B for mapping each of the data packets that arrives at each one of the input ports to a respective one of the queue to the output ports. As illustrated in FIG. 9, the output port 40 is further comprised of a scheduling controller and transmit buffer 45.

Figures 5A, 5B, 5C:
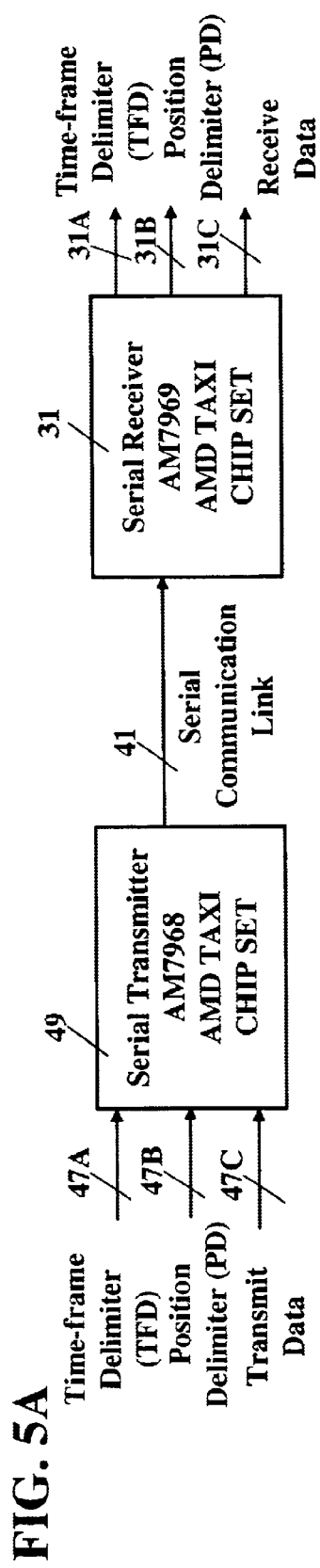
FIG. 5A is a schematic block diagram of the link layer of a synchronous virtual pipe of the present invention.
FIG. 5B is a data word encoding table of the present invention.
FIG. 5C is a control word encoding table of the present invention.

An output port 40 is connected to a next input port 30 via a communication link 41, as shown in FIGS. 3 and 5A. The communication link can be realized using various technologies compatible with the present invention including fiber optic conduits, copper and other wired conductors, and wireless communication links—including but not limited to, for example, radio frequency (RF) between two ground stations, a ground station and a satellite, and between two satellites orbiting the earth, microwave links infrared (IR) links, optical communications lasers. The communication link does not have to be a serial communication link. A parallel communication link can be used—such a parallel link can simultaneously carry multiple data bits, associated clock signals, and associated control signals.

As shown in FIG. 1, the common time reference 002 is provided to the input ports 30 and output ports 40 (comprising the input/output ports 30/40) from the GPS time receiver 20, which receives its timing signal from the GPS antenna 001. GPS time receivers are available from variety of manufacturers, such as, TrueTime, Inc. (Santa Rosa, Calif.). With such equipment, it is possible to maintain a local clock with accuracy of ±1 microsecond from the UTC (Coordinated Universal Time) standard everywhere around the globe.

Referring to FIG. 5A, a serial transmitter 49 and serial receiver 31 are illustrated as coupled to each link 41. A variety of encoding schemes can be used for a serial line link 41 in the context of this invention, such as, SONET/SDH, 8B/10B Fiber Channel, and 4B/5B FDDI (fiber distributed data interface). In addition to the encoding and decoding of the data transmitted over the serial link, the serial transmitter/receiver (49 and 31) sends/receives control words for a variety of in-band control purposes, mostly unrelated to the present invention description.

However, one control word, time frame delimiter (TFD), is used in accordance with the present invention. The TFD marks the boundary between two successive time frames and is sent by a serial transmitter 49 when a CTR 002 clock tick occurs in a way that is described hereafter as part of the output port operation.

It is necessary to distinguish in an unambiguous manner between the data words, which carry the information, and the control signal or words (e.g., the TFD is a control signal) over the serial link 41. There are many ways to do this. One way is to use the known 4B/5B encoding scheme (used in FDDI). In this scheme, every 8-bit character is divided into two 4-bit parts and then each part is encoded into a 5-bit codeword that is transmitted over the serial link 41.

In a preferred embodiment the serial transmitter 49 and receiver 31 comprise AM7968 and AM7969 chip sets, respectively, both manufactured by AND Corporation.

FIG. 5B illustrates an encoding table from 4-bit data to 5-bit serial codewords. The 4B/5B is a redundant encoding scheme, which means that there are more codewords than data words. Consequently, some of the unused or redundant serial codewords can be used to convey control information.

FIG. 5C is a table with 15 possible encoded control codewords, which can be used for transferring the time frame delimiter (TFD) over a serial link. The TFD transfer is completely transparent to the data transfer, and therefore, it can be sent in the middle of the data packet transmission in a non-destructive manner.

When the communication links 41 are SONET/SDH, the time frame delimiter cannot be embedded as redundant serial codewords, since SONET/SDH serial encoding is based on scrambling with no redundancy. Consequently, the TFD is implemented using the SONET/SDH frame control fields: transport overhead (TOH) and path overhead (POH). Note that although SONET/SDH uses a 125 microseconds frame, it cannot be used directly in accordance with the present invention, at the moment, since SONET/SDH frames are not globally aligned and are also not aligned to UTC. However, if SONET/SDH frames are globally aligned, SONET/SDH can be used compatibly with the present invention.

As shown in FIG. 7, the input port 30 has several parts including: serial receiver 31, a routing controller 35 and separate queues to the output ports 36. The serial receiver 31 transfers the incoming data packets and the time frame delimiters to the routing controller 35.

The routing controller 35 comprises a controller 35B that is constructed of a central processing unit (CPU), a random access memory (RAM) for storing the data packet, read only memory (ROM) for storing the routing controller processing program; and a routing table 35D that is used for determining the output port that the incoming data packet should be switched to.

Figure 6A:
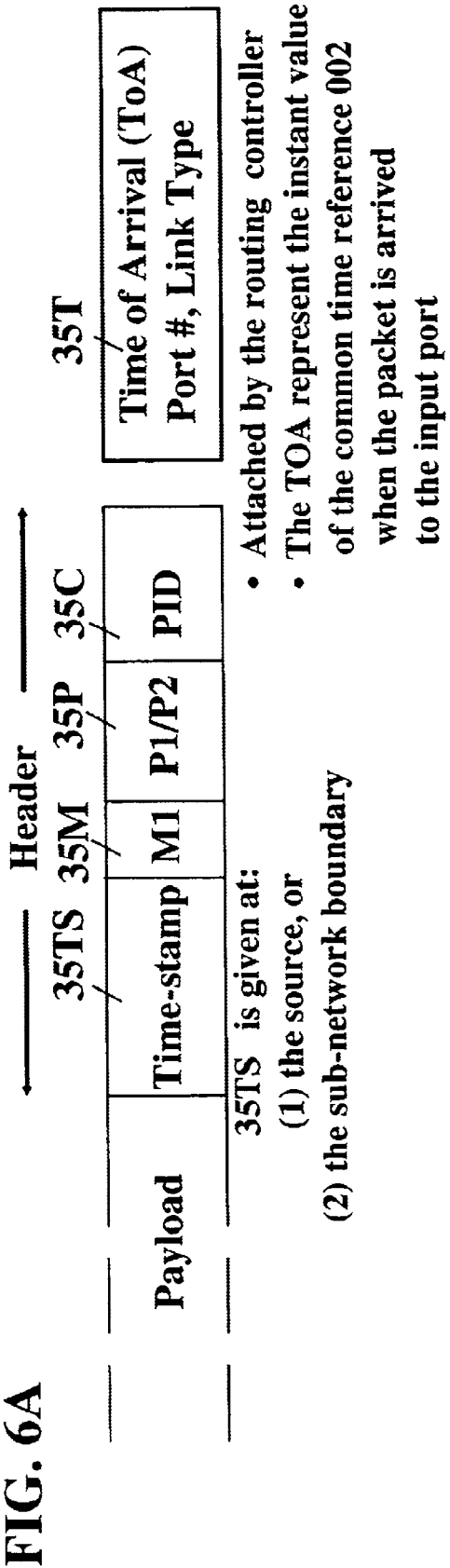
FIG. 6A is an illustration of the structure of a data packet with header as used in the present invention.

The incoming data packet consists of a header and a payload portion. The header includes, as shown in FIGS. 6A and 6B, a time stamp value 35TS, a multi-cast indication 35M, a priority indication 35P, and a virtual pipe ID indication 35C. The priority indication 35P may include encoding of a high and a low priority. In an alternate embodiment, multiple levels of priority are encoded by priority indication 35P. In a preferred embodiment the multiple levels of priority include Constant Bit Rate (CBR) priority, Variable Bit Rate (VBR) priority, "best-effort" (BE) priority, and Rescheduled priority. The multi-cast indication 35M may include encoding indicating one destination or a plurality of destinations. In the case of a plurality of destinations, there can be one or more PIDs.

Referring back to FIG. 7, the incoming data packet header includes a virtual pipe identification, PID 35C, that is used to lookup in the routing table 35D the address 35E of the queue 36 that the incoming data packet should be transferred into.

Before the incoming data packet is transferred into its queue 36, the time of arrival (ToA) information 35T is attached to the data packet header as illustrated in FIGS. 6A and 6B. The ToA information is the value of the common time reference (CTR) signal 002 at the time the incoming data packet arrived at the input port. In a preferred embodiment, the ToA 35T may additionally comprise a port number and a link type indication. The ToA 35T is used by the scheduling controller 45 of the output port 40 in the computation of the forwarding time out of the output port, and shown in FIG. 9. Note that the ToA 35T value that is appended to the incoming data packet is distinct and separate from the time stamp value 35TS that is included as part of the incoming data packet header. After the incoming data packet has the ToA information appended to it, it is routed by the routing controller 35B via respective buses (31-1, 31-N) to the respective appropriate queue 36.

The ToA 35T and time stamp 35TS can have plurality of numerical formats. For example, the format of the Network Time Protocol (NTP) [D. Mills, *Network Time Protocol* (version 3) IETF RFC 1305] is in seconds relative to 0h UTC on Jan. 1, 1900. The full resolution NTP time stamp is a 64-bit unsigned fixed-point number with the integer part in the first 32 bits and the fractional part in the last 32 bits. In some fields where a more compact representation is appropriate, only the middle 32 bits are used; that is, the low 16 bits of the integer part and the high 16 bits of the fractional part. The high 16 bits of the integer part must be determined independently.

The incoming data packet can have various formats, such as but not limited to Internet protocol version 4 (IPv4), Internet protocol version 6 (IPv6), and asynchronous transfer mode (ATM) cells. The data packet's PID 35C can be determined by but is not limited to one of the following: an Internet protocol (IP) address, an asynchronous transfer mode (ATM) a virtual circuit identifier, a virtual path identifier (VCI/VPI), Internet protocol version 6 (IPv6) addresses, Internet Multi Protocol Label Swapping (MPLS) or tag switching labels, and an IEEE 802 MAC (media access control) address.

Figure 8:
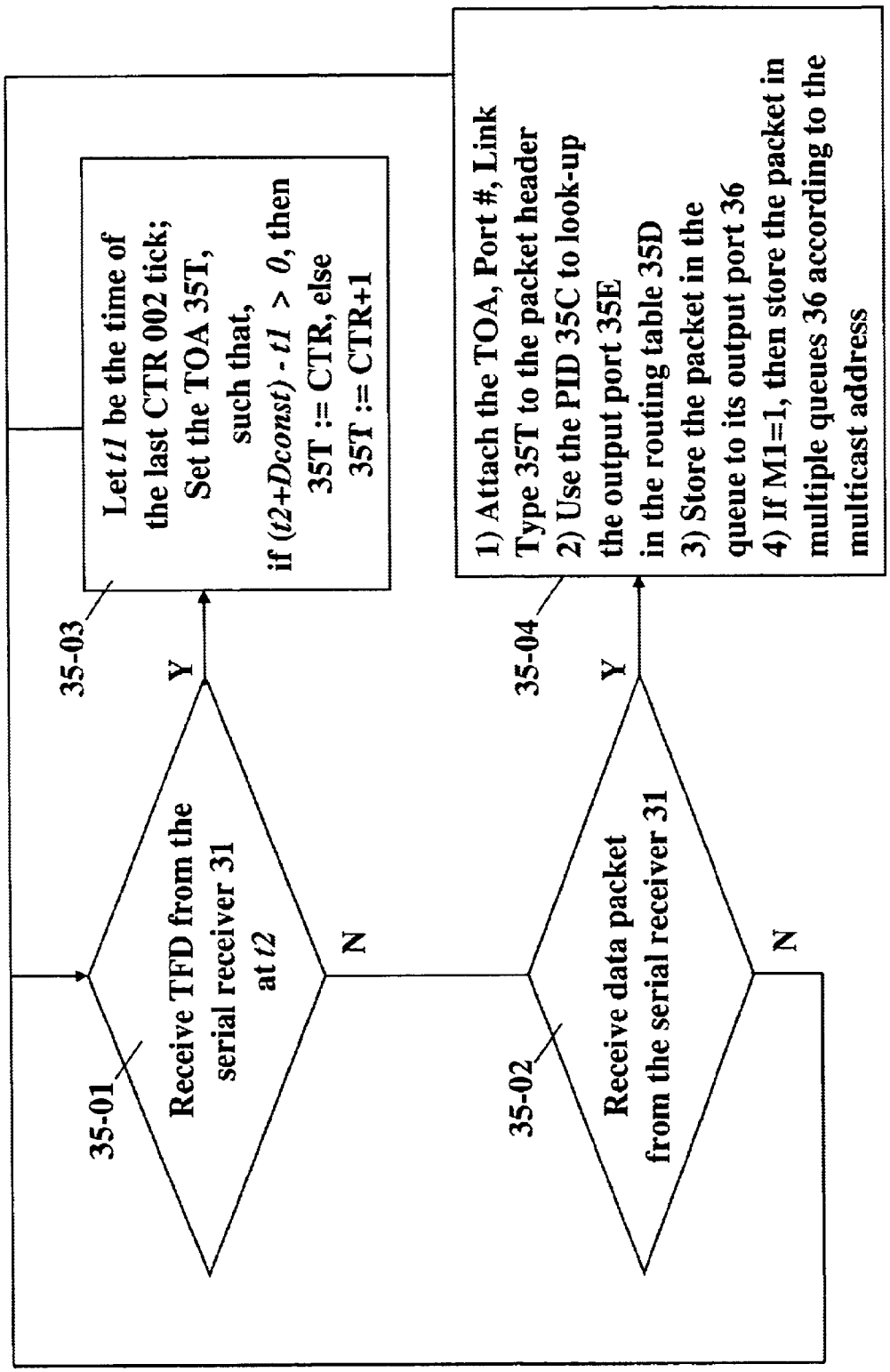
FIG. 8 is a flow diagram illustrating the operation of the routing controller of the present invention.

FIG. 8 illustrates the flow chart for the router controller 35 processing program executed by the routing controller 35B. The program is responsive to two basic events from the serial receiver 31 of FIG. 7: the received time frame delimiter TFD act step 35-01, and the receive data packet at step 35-02. After receiving a TFD, the routing controller 35 computes the time of arrival (ToA) 35T value at step 35-03 that is to be attached or appended to the incoming data packets.

For the computation of the ToA information 35T the routing controller uses a constant, Dconst, which is the time difference between the common time reference (CTR) 002 tick and the reception of the TFD at time t2 (generated on an adjacent switch by the CTR 002 on that node). This time difference is caused by the fact that the delay from the serial transmitter 49 to the serial receiver 31 is not an integer number of time frames.

When the data packet is received at step 35-02, the routing controller 35B executes the four operations as set forth in step 35-04: attach the ToA information, lookup the address of the queue 36 using the PID, storing the data packet in that queue 36, and decode and process multi-cast indication 35M.

The first operation of step 35-04 attaches or appends the ToA information computed in step 35-03 to the incoming data packet. The ToA information 35T may also include link type and port information, as discussed above. The second operation in step 35-04 uses the PID 35C to reference lookup table 35D to determine the address of the output port 35E of the selected output port queue. The third operation of step 35-04 copies, forwards, or transfers the incoming data packet to the queue 36 responsive to the address 35E.

The fourth operation of 35-04 (decode and process multi-cast indication) may also comprise the method of copying the incoming data packet with appended or attached ToA information into a plurality of the queues 36 to effect a simultaneous multi-cast forwarding operation where the incoming data packet is simultaneously forwarded to more than one output port queue.

There are various ways to implement a switching fabric. However, the switching fabric is peripheral to the present invention, and so it will be described only briefly. The main property that the switching fabric should ensure is that data packets for which the priority indicator (35P in FIGS. 6A and 6B) is set to high, CBR, or VBR, then priority (i.e. reserved traffic) will be switched into the output port in a constant bounded delay, measured in time frames.

This is possible in accordance with the present invention, where the data packets in the input ports are already separated into queues to their respective output ports. Then, by using the Clos theorem in the time domain (see *Switching and Traffic Theory for Integrated Broadband Networks*, J. Y. Hui, page 65), the delay can be bounded by a duration equal to two time frames, wherein one time frame duration is consumed at the input port and one time frame duration is consumed to get across the switching fabric. Other implementations can be used, such as based on shared bus with round robin service of the high priority data packets, or on a crossbar switch.

Another possible switch design is shared memory, which ensures a deterministic delay bound from an input port to an output port. Shared memory packet switches are commercially available from various vendors, for example, MMC Networks Inc. (Santa Clara, Calif.).

The output port 40 is illustrated in FIG. 9, comprised of a scheduling controller with a transmit buffer 45, and serial transmitter 49 as previously described herein. The scheduling controller 45 performs a mapping of each of the data packets between the associated respective time of arrival (ToA) and an associated forwarding time out of the output port via the serial transmitter 49. The forwarding time is determined relative to the common time reference (CTR) 002. Data packets arrive from the switching fabric via coupling 51 to the scheduling controller and transmit buffer 45. Scheduled data packets are forwarded out of the scheduling controller and transmit buffer 45 via couplings 47A, 47C to the serial transmitted 49. The serial transmitter 49 forwards outgoing data packets via communications link 41.

Figure 10:
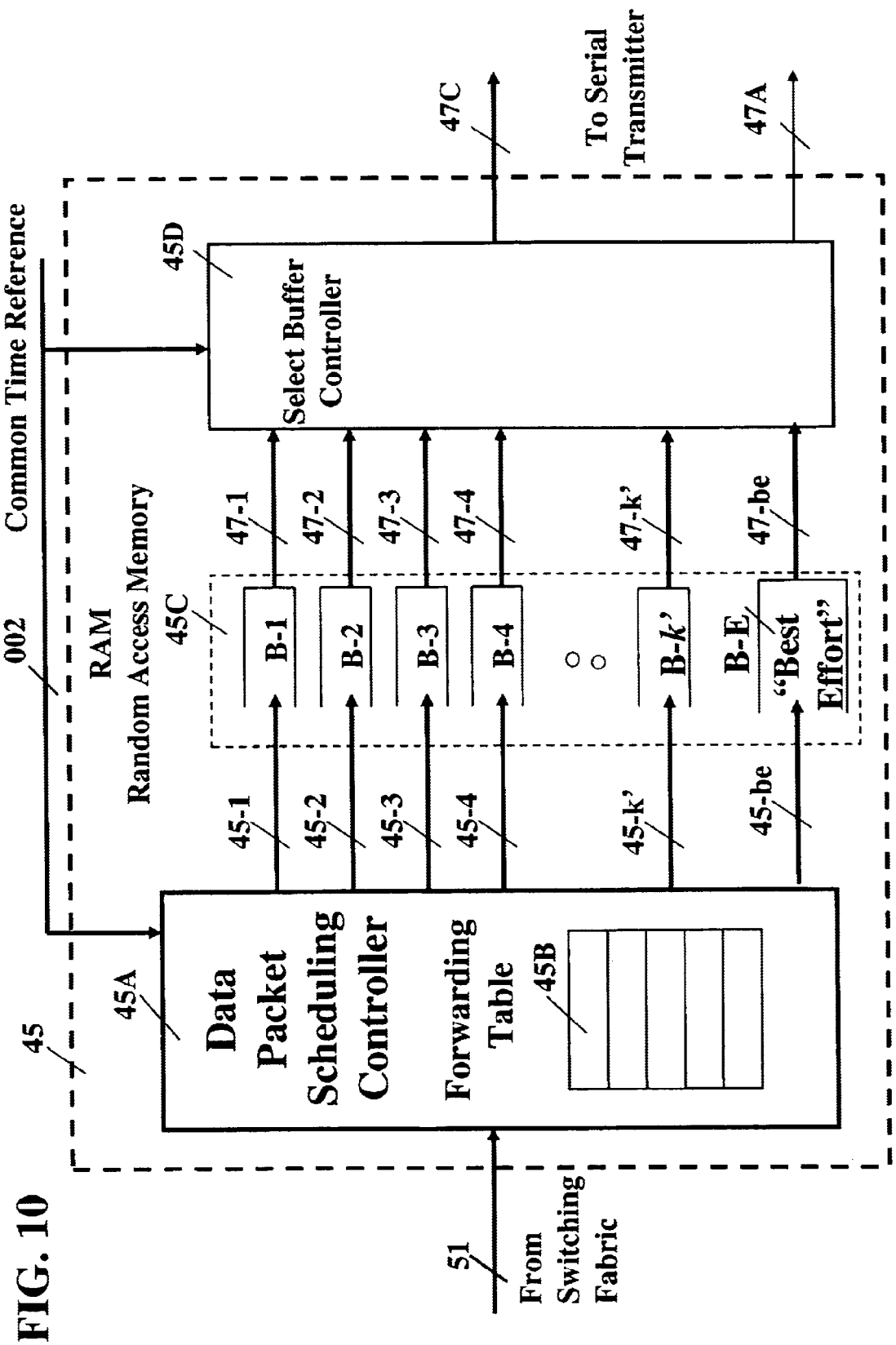
FIG. 10 is a schematic block diagram of the scheduling controller and select buffer controller of the present invention.
Figure 11:
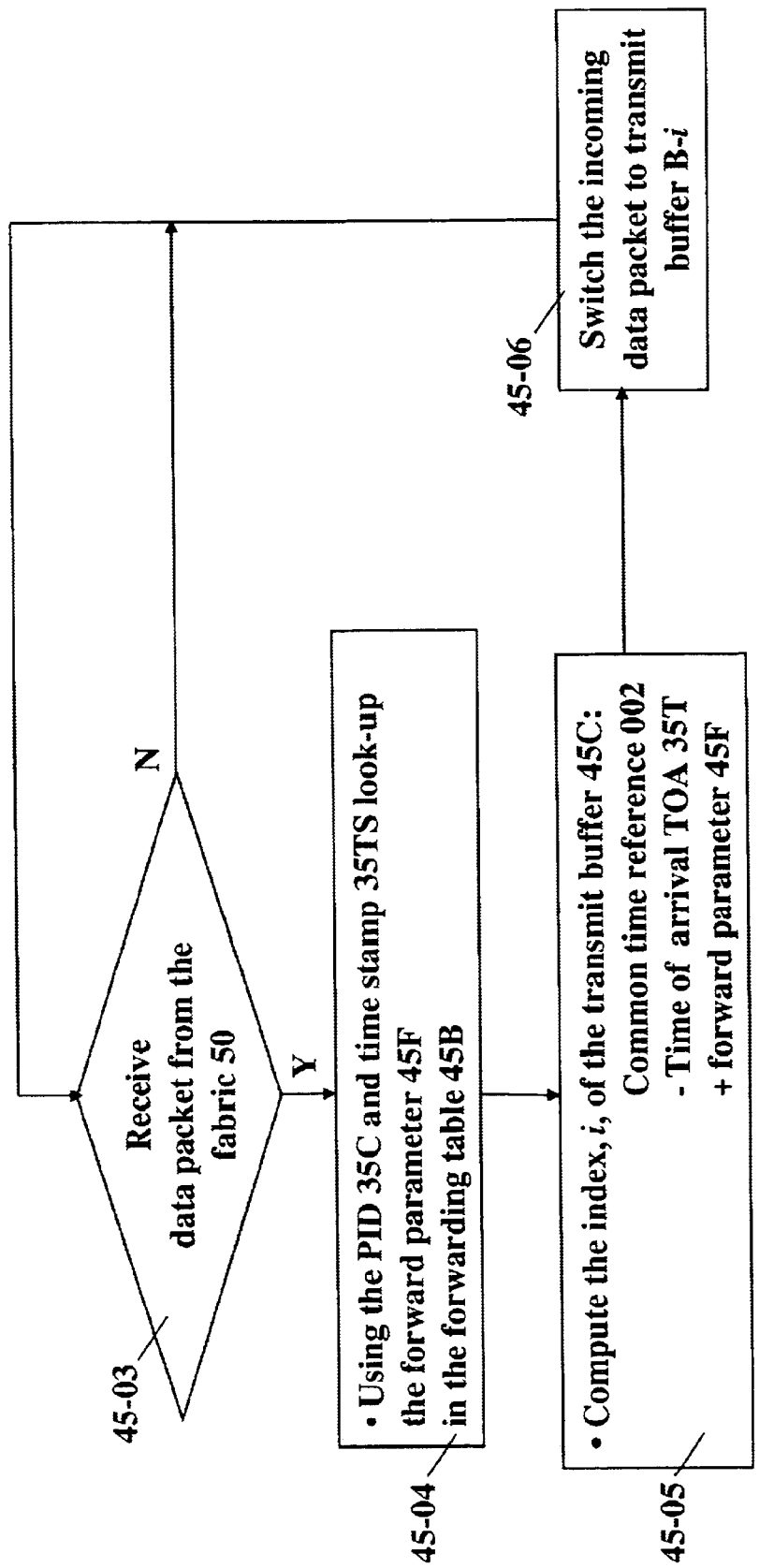
FIG. 11 is a flow diagram illustrating the operation of the scheduling controller of the present invention.
Figure 12:
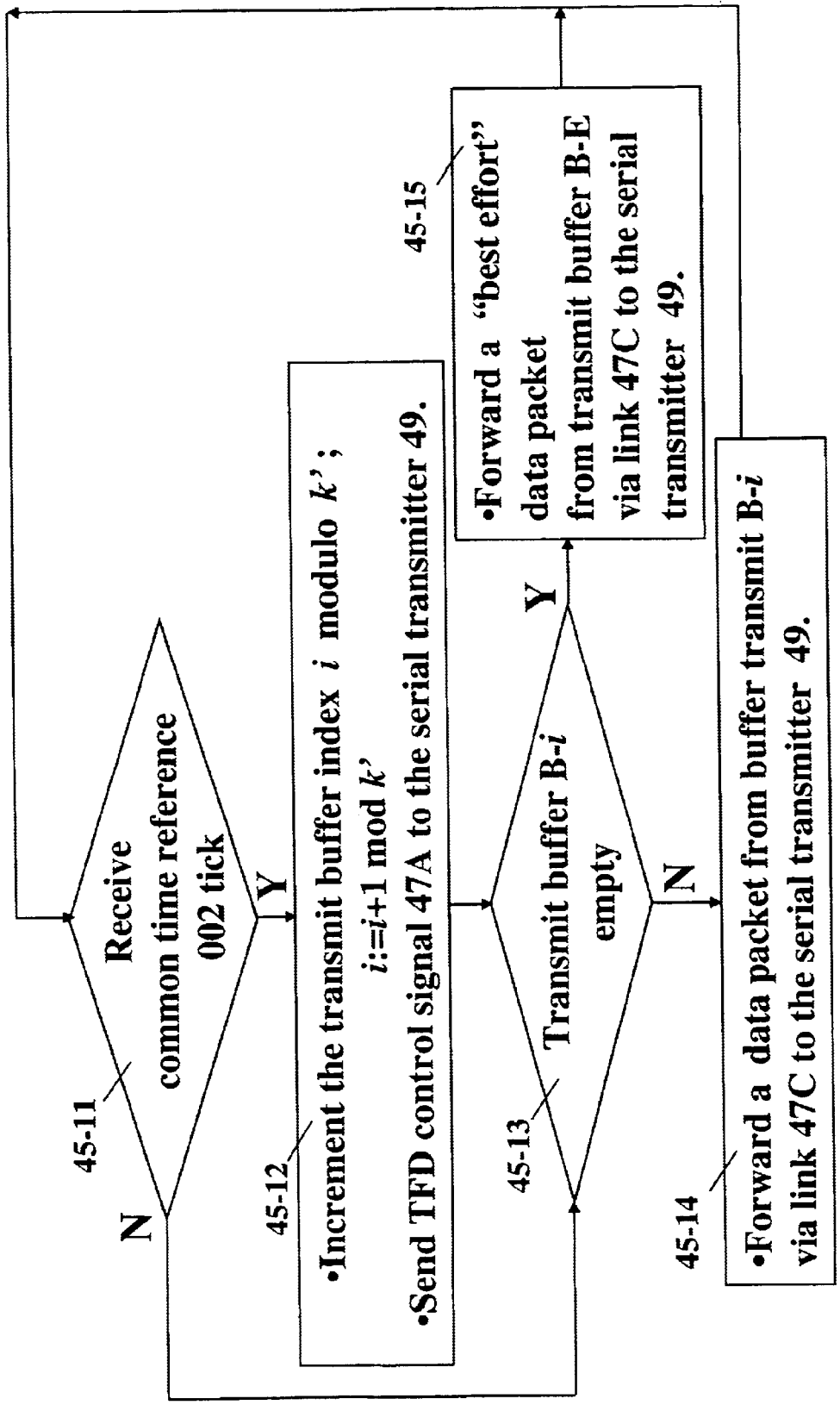
FIG. 12 is a flow diagram illustrating the operation of the select buffer controller of the present invention.

Referring to FIGS. 10–12, the scheduling controller and transmit buffer 45 operation and structure are described. As shown in FIG. 10, the scheduling controller and transmit buffer 45 comprises a data packet scheduling controller 45A coupled to transmit buffers 45C via connections 45-1, 45-2, . . . 45-k', and 45-be. The transmit buffers 45C are coupled via connections 47-1, 47-2, . . . 47-k', and 47-be to the select buffer controller 45D.

The data packet scheduling controller 45A, together with the select buffer controller 45D, perform the mapping, using the PID 35C and the data packet time of arrival (ToA) 35T in order to determine the respective time frame a respective data packet should be forwarded out of the output port. Both controllers 45A and 45D are constructed of a central processing unit (CPU), a random access memory (RAM) for storing the data, and read only memory (ROM) for storing the controller processing program. The data packet scheduling controller 45A additionally comprises a forwarding table 45B.

Data packets arrive from the switching fabric 50 (not shown) via link 51. Data packets which have high priority, as determined by priority indicator 35P, are switched by the scheduling controller 45A to one of the k transmit buffers 45C (B-1, B-2, . . . , B-k'). Each of the transmit buffers is designated to store data packets that will be forwarded in each of the respective time frames in every time cycle, as shown in FIG. 4. Data packets which have low priority, as determined by priority indicator 35P, are switched by the scheduling controller 45A to the transmit buffer B-E for "best-effort" transmission. Low priority traffic is non-reserved and may include "best-effort" traffic and rescheduled data packets.

The common time reference (CTR) signal 002 is coupled to the data packet scheduling controller 45A and the select buffer controller 45D and provides for timely transmission of outgoing data packets.

The flow chart for the program executed by the data packet scheduling controller 45A is illustrated in FIG. 11. When the data packet is received from the switch fabric 50 at step 45-03, the PID 35C and the time stamp 35TS in the data packet header are used to look-up the forward parameter 45F in the forwarding table 45B, as specified in step 45-04. Next, the index i of the transmit buffer 45C, between B-1 and B-k', is computed in step 45-05 by subtracting the time of arrival ToA 35T from the common time reference CTR 002 and by adding the forward parameter 45F. As shown in step 45-06, after the index i is computed, it is used to schedule the data packet from the switch fabric to transmit buffer B-i.

The flow chart for the program executed by the select buffer controller 45D is illustrated in FIG. 12. The controller 45D determines if a common time reference (CTR) tick 002 is received at step 45-11. If the common time reference tick is received, step 45-12 increments the transmit buffer index i (i.e., i:=i+1 mod k', where k' is the number of buffers for scheduled traffic, one for each time frame in a time cycle). The controller 45D also sends a time frame delimiter TFD to the serial transmitter at step 45-12.

At step 45-13 the transmit buffer B-i is checked to see if it is empty. If it is not empty, step 45-14 forwards the data packet present in transmit buffer B-i via link 47C to transmitter 49. If the determination of step 45-13 is that transmit buffer B-i is empty, then time frame i is available for "best-effort" traffic. For "best-effort" traffic, step 45-15 forwards the data packet present in transmit buffer B-E via link 47C to transmitter 49.

It is an object of the present invention to convey scheduled data packets over a synchronous virtual pipe to a shared media access network. This is accomplished by providing a common time reference (CTR) signal 002 for both the synchronous virtual pipe and to the master arbiter and scheduler for the shared media access network. The master arbiter and scheduler for the shared media access network arbitrates and schedules the use of the shared resource of the shared media network between a plurality of end-stations and itself. This function is accomplished by the shared media access time manager 100 of the present invention.

By coupling a common time reference to both the synchronous virtual pipe and the shared media network, data transmission of data packets can be scheduled in coordination with the common time reference so that a data packet is complete and prepared for transmission within a scheduled respective time frame for all associated time cycles. This scheduling is performed, in the simplest embodiment, by taking a predefined and known amount of time that the assembly of data into packets and other preparation will require and subtracting that from the scheduled time frame for transmission. If the assembly of data and preparation of data packets starts at the scheduled start time, it will complete just in time for transmission on the scheduled time frame over the synchronous virtual pipe.

It is to be appreciated that this scheduling reduces the latency incurred by each data packet to the minimum possible; and that since data packets are conveyed by a synchronous virtual pipe, the jitter of the arrival times of the data packets at their destination is well-defined and bound to a small value. Both minimal latency and minimal jitter are requirements for conveying many kinds of communications data via data packets, particularly including any whose signals originate in the time domain, such as but not limited to voice, audio, video, audiovisual, multimedia, HDTV, and data acquisition.

FIG. 13 illustrates one embodiment of the structure of a shared media network of the present invention. The shared media network comprises an SVP switch 10, a time receiver 20, at least one input port 30, at least one output port 40, and a shared media access time manager 100. The input ports 30 are coupled to the shared media access time manager 100 (SMATM). The SMATM has two additional sub-components:

1. means for processing a plurality of format types of data packets 100A.
2. means for desynchronizing the data packet flow to and from the shared media network by using a scheduling controller and transmit buffer 100B, this component is implemented as previously described component 45 in FIG. 10.

The output ports 40 are also coupled to the shared media access time manager 100. The time receiver 20, which may be a GPS time receiver, is coupled to the input ports 30, the output ports 40, and the shared media access time manager 100 via a common time reference (CTR) signal 002. In this manner, a common time reference is supplied to the access time manager, each of the input ports, and each of the output ports within the SVP switch 10.

The time receiver 20 receives a distributed common time reference 001 from a source (e.g., GPS) via antenna or other well-known means. Each of the respective input ports 30 and output ports 40 are coupled to a synchronous virtual pipe network (not shown) via synchronous virtual pipes 41. The synchronous virtual pipes 41 can be implemented within an IP network or other kind of network.

In the present embodiment, the shared media access time manager 100 of the SVP switch 10 is coupled to the shared media network 200 via communications link 101. The shared media network 200 may comprise a desktop network (e.g., IEEE 1394 or similar), cable modem network (e.g., IEEE 802.14 or similar), wireless network (e.g., IEEE 802.11 or similar), storage area network (SAN) (e.g., FC-AL, SSA), and/or other shared media network types, where the shared media network 200 is in turn coupled via links 301 to a plurality of end-stations 300. The end-stations 300 provide an access-time responder function to the shared media access time manager 100.

In an embodiment where the shared media network 200 is a desktop network such as IEEE 1394, the shared media access time manager 100 additionally comprises the functions of an IEEE 1394 master controller. Also in this embodiment, the end-stations 300 each comprise peripheral equipment compatible with the IEEE 1394 standard, each connected to the shared IEEE 1394 physical network via IEEE 1394 cables 301.

In an embodiment where the shared media network 200 is a cable modem network such as DOCSIS or IEEE 802.14, the shared media access time manager 100 additionally comprises the functions of a cable modem head-end controller and arbiter. Also in this embodiment, the end stations 300 each comprise cable modem or set-top boxes compatible with the appropriate cable standards, the shared media network 200 comprises a cable tree of communications links, amplifiers, and switches, and the links 301 represent wideband cable leaf connections to the cable tree having the root 101 of the tree coupled to the access time manager 100.

In an embodiment where the shared media network 200 is a wireless network such as G3 or IEEE 802.11, the shared media access time manager 100 additionally comprises the functions of a wireless base station controller and scheduler. Also in this embodiment, the end stations 300 comprise wireless transceivers, the shared media network 200 and links 301 comprise over-the-air transmission media, and the link 101 represents a physical link from the base station to a transmission center.

In an embodiment where the shared media network 200 is storage area network (SAN) (e.g., FC-AL, SSA) the end-stations are a wide variety of magnetic and electronic storage devices.

Figure 14:
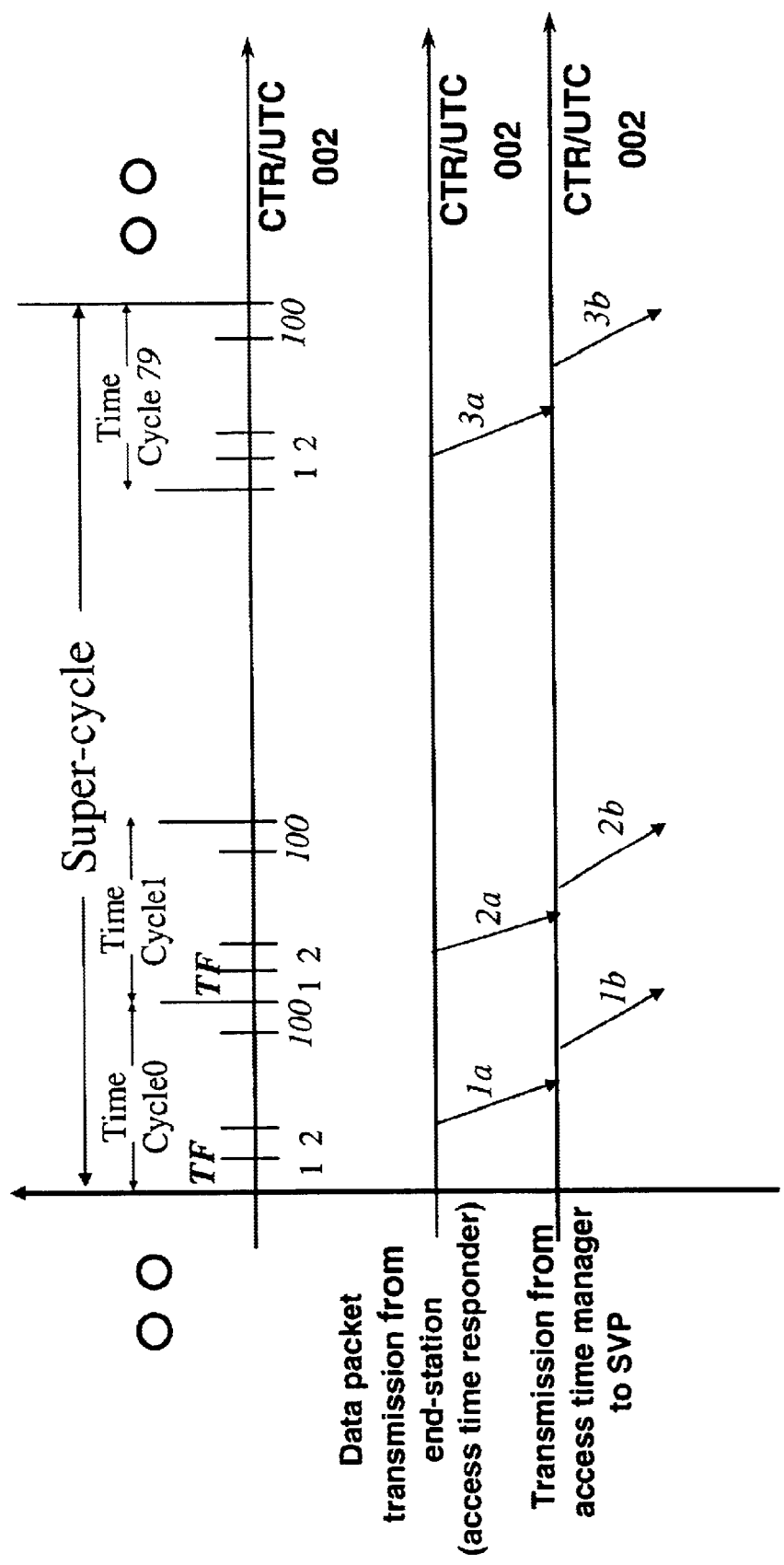
FIG. 14 is a timing diagram illustrating timely periodic transmission of data across the shared media network as in the present invention.

Referring simultaneously to both FIGS. 13 and 14, FIG. 14 illustrates the timing associated with the operations of assembling data into data packets, preparing the data packets, and transmission of data packets in the present invention. The access time manager 100 is responsible for scheduling data from end-stations 300 to be transmitted via the shared media network 200 to arrive at the access time manager 100 during particular time frames within a time cycle. In the illustrated example timing, an end-station 300 provides transmission 1a of a data packet starting at time frame 2 within time cycle 0. The received data packet is forwarded to the output port 40, in FIG. 13, immediately following receipt of transmission 1a. The data packet is then forwarded out the output port 40 at time 1b within a reserved time frame to a synchronous virtual pipe 41 by the access time manager 100, in cooperation with the SVP switch 10.

The end-station 300 is scheduled by the access time manager 100 to continue to transmit data starting at the same time frame within each time cycle. After each additional data packet 2a, 3a is received by the access time manager 100, it is forwarded to the appropriate output port 40 and then forwarded at 2b, 3b out to the appropriate output port 40 of the SVP switch 10 at consistent scheduled respective time frames.

In another embodiment, referring again simultaneously to both FIGS. 13 and 14, the shared media access time manager 100 comprises both a first and a second scheduling controller. The first scheduling controller defines a plurality of predefined time frames responsive to the common time reference signal, and schedules a first time frame for the transfer of the data packets from the shared media network to the point-to-point network (e.g., synchronous virtual pipe) responsive to the common time reference signal. A second scheduling controller schedules a time interval for the transfer of the data packets from the end-station to the shared media network, responsive to the first scheduling controller. The first and the second scheduling controllers schedule their respective data transfer in alternating sequential time order to effectuate the transfer of a plurality of the data packets over a plurality of the first time frames and a plurality of the time intervals.

In an alternate embodiment, the assembly of data packets and preparation operations may additionally comprise the method of data compression, wherein the data in a data packet are compressed to further reduce the data packet bandwidth or data packet size required for transmission, so as to further reduce the loading requirements on the shared media network.

FIG. 14 shows the timing of the regular operations of assembling data into data packets, preparing the data packets, and the corresponding virtually immediate (e.g., in the next time frame) transmission of the data packets provided by the present invention. Data packets are scheduled for immediate transmission within reserved time frames, thus congestion and routing latency within the access time manager 100 are eliminated in the present invention.

Figure 15:
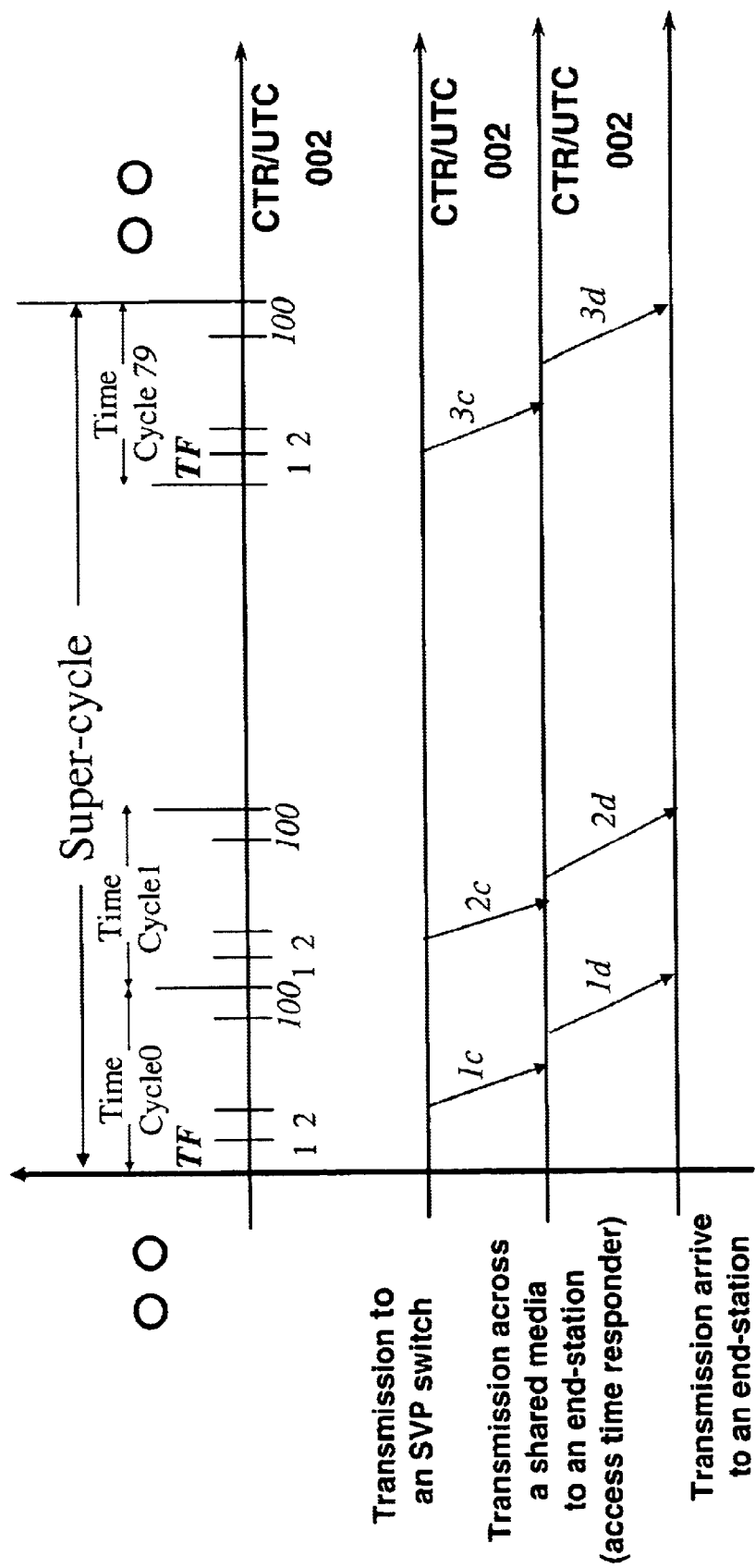
FIG. 15 is a timing diagram illustrating timely periodic reception of data across the shared media network as in the present invention.

Referring simultaneously to both FIGS. 13 and 15, FIG. 15 illustrates the timing associated with the reception data packets of the present invention. The shared media access time manager 100 is responsive to receipt of data packets from a synchronous virtual pipe 41 via an input port 30. The data packets are transmitted to arrive 1c at the access time manager 100 regularly at predefined time frames in each time cycle, which is just after time frame 2 in the illustrated example.

The access time manager 100 is responsible for scheduling data packets arriving from the synchronous virtual pipe 41 via the input port 30 to be transmitted via the shared media network 200 to arrive at the shared media network end-stations 300 during particular time frames within a time cycle. The data packets are transmitted at time 1d to arrive at the end-station.

The access time manager 100 reserves time frames and schedules itself to continue to transmit data packets starting at the same time frame within each time cycle. After each additional data packet 2c, 3c, is received by the access time manager 100, it is transmitted 2d, 3d to the appropriate end-station 300 via the shared media network 200 at a consistent scheduled respective time frame.

The regularity of arriving data at the same time frame of each time cycle provides for uninterrupted receipt of digital data at the end-stations 300. The jitter present in the received data packet arrival times is controlled by the common time reference to be small and well-bounded. In another embodiment of this invention, a data packet that arrives at the shared media network can be scheduled to be forwarded to multiple end-station either simultaneously at the same schedule or at multiple schedules.

The SMATM has a sub-component for processing a plurality of format types of data packets 100A. This sub-component converts from a first format types of data packets to a second format types of data packets. The first and second format types can be one of: ATM, IP, fiber channel for FC-AL, SSA, DOCSIS, IEEE 802.14, and IEEE 802.11. This sub-component 100A is also capable of converting format types of data packets of different sizes, thus the number of transmission schedules over the shared media network can be different than the number of transmission schedules over the point-to-point network in the synchronous virtual pipe (SVP). More specifically, if within a time cycle and a super cycle there are: (1) a first number of schedules for the transmission of data packets of the first format type and (2) a second number of schedules for the transmission of data packets of the second format type; then the sub-component 100A by means of a predefined scheduling table converts: (1) the first number of schedules to the second number of schedules and (2) the second number of schedules to the first number of schedules.

The SMATM has a sub-component 100B for regulating the data packet flow to and from the shared media network by using a scheduling controller and transmit buffer 100B; this component is implemented as previously described component 45 in FIG. 10. The sub-component 100B uses four parameters: (1) the pipe-ID (PID), (2) the time stamp in the data packet header, (3) the common time reference, and (4) the time of arrival (TOA) attached by the SMATM to the incoming data packets from the shared media network and from SVP. Using these parameters sub-component 100B assigns selected predefined time frames for synchronously transmitting data packets over the synchronous virtual pipe and the shared media network.

Figure 16:
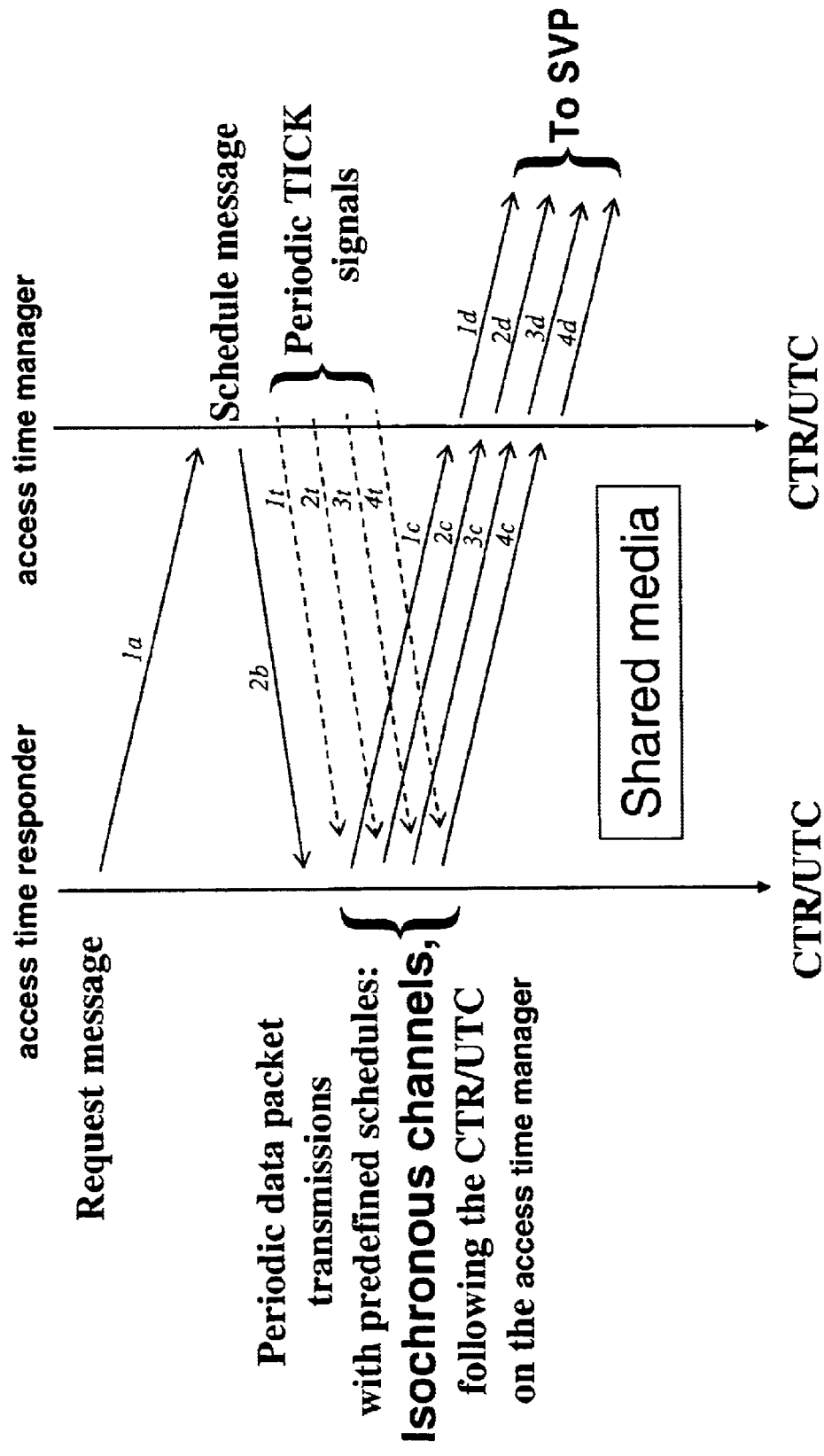
FIG. 16 illustrates the protocol used to schedule transmission access to the shared media network as used in the present invention.

Referring simultaneously to both FIGS. 13 and 16, FIG. 16 shows the protocol used to set up a schedule of periodic transmissions from an end-station 300 to the access time manager 100 for subsequent forwarding a synchronous virtual pipe 41 in the preferred embodiment of the present invention. The end-station 300 that operates as an access time responder issues a request 1a to the access time manager 100. The request 1a describes the nature of the data to be transmitted and the destination, permitting the access time manager 100 to determine what parameters (e.g., periodicity, reserved time frames, etc.) needs to be scheduled to fulfill the request.

Upon determining a schedule suitable to satisfy request 1a, the access time manager issues a response 2b to the access time responder which describes to the corresponding end-station the parameters (e.g., periodicity, reserved time frames, etc.) have been reserved for its use. These parameters are issued with respect to a common time reference (CTR) 002 shared by all end-stations 300 and the access time manager 100 via the shared media network 200.

Note that in one embodiment the request 1a and the response 2b may occur during a time interval scheduled by the access time manager specifically for use in negotiating requests. In an alternate embodiment, either or both of request 1a and response 2b may occur during other times such as permitted by the existing schedules maintained by the access time manager 100 for shared media network 200.

Upon receipt of the response 2b, the end-station access time responder is then permitted to transmit, at the indicated intervals, data packets to be forwarded to a synchronous virtual pipe. In the illustrated example, the access time responder has been scheduled to transmit data packets on the shared media network 200 at times 1c, 2c, 3c, and 4c. The access time manager 100 accepts data packets from the shared media network 200, and then forwards corresponding data packets via the synchronous virtual pipe 41 at times 1d, 2d, 3d, and 4d, respectively. The times 1c, 2c, 3c, 4c, 1d, 2d, 3d, and 4d are all defined with respect to the common time reference signal. In another embodiment of this invention, the access time manager 100 accepts data packets in multiple parts (e.g., some cable modem protocols) from the shared media network 200, assembles the multiple parts into data packets, and performs any other processing necessary for the request, and then forwards corresponding data packets via the synchronous virtual pipe 41.

In another embodiment of this invention, there are two distinct data packet formats: one over SVP (e.g., IP), and the other over the shared media network. The data packet formats over the shared media networks correspond to the specific shared media protocol. In such cases, the access time manager additionally performs the necessary data packet format conversion.

In a preferred embodiment, the access time manager 100 provides a response 2b that describes an isochronous channel on the shared media network 200. An isochronous channel is one that provides for periodic reserved transmission of data on a shared media The isochronous periodicity may be simple or complex. Simple isochronous periodicity provides for consistent, regular transmissions of same-sized groups of data. Complex isochronous periodicity permits irregular but defined transmissions of more than one differently sized groups of data at some regular interval.

FIG. 21A is an illustration of the data requirements for simple isochronous periodicity. In this illustrated example, data is provided in a single fixed amount at a periodic interval. Referring back to FIG. 16, in the example of FIG. 21A the access time manager 100 would schedule simple isochronous periodic transmissions at times 1c, 2c, 3c, and 4c to be of fixed and equal duration, and thus fixed and equal amounts of data for each transmission.

FIG. 21B is an illustration of the data requirements for complex or irregular isochronous periodicity. In this illustrated example, data is provided in two different amounts at a periodic interval, corresponding to a repeating pattern of I-frames and P-frames. The data requirements as shown are very common for compressed video data sources. As shown in this example, the pattern of one I-frame and several P-frames repeats once per super-cycle, although in practice the pattern may repeat at a different interval. The amount of data required for an I-frame is significantly higher than the amount of data required for each of the P-frames. As a result, this data transmission pattern has complex isochronous periodicity, requiring above-average amounts of data at some intervals (i.e., the I-frame in each super-cycle) and average amounts of data at more frequent intervals (i.e., the plurality of P-frames in each super-cycle). Referring back to FIG. 16, in the example of FIG. 21B the access time manager 100 would schedule complex isochronous periodic transmissions such that the transmission time allocated on the shared media network 200 at time 1c would be greater than the transmission time allocated on the shared media network at times 2c, 3c, and 4c.

The following is a simple numerical example for complex periodicity scheduling with compressed video sources, such as MPEG (familiarity with which is assumed below), in the following way:

Let the video-frame rate be 20 video frames
per second or every 50 ms

Let $T_f$ be 1 ms

Let k=50 and the time cycle be 50 ms

Let the size of each I video-frame be bounded by 100 KBytes and the size of the P video-frames be bounded by 10 KBytes.

Assume that an I video-frame is followed by five P video-frames.

Next, create a super-cycle of 6 time cycles, each time cycle has 50 time frames. The complex periodicity forwarding can be done in the following manner:

Step 1: The video stream is divided into 2 Kbytes data packets.

Step 2: The I video-frame is divided into 50 packets which are sent in 50 predefined time frames in time cycle number one.

Step 3: Each of the P video-frames is sent in 5 predefined time frames in each of the following 5 time cycles.

Step 4: GOTO Step 1 and repeat the six time cycles pattern.

In another preferred embodiment, the access time manager 100 provides in addition to the schedule message response 2b specific TICK signals, 1t, 2t, 3t, 4t, in FIG. 16, indicating the specific transmission time by the end-station (on access time responder). Consequently, the transmission 1c, 2c, 3c, and 4d are in response to TICK signals 1t, 2t, 3t, and 4t, respectively, as shown in FIG. 16. In such an embodiment, the isochronous channel across the shared media network 200 is actually created by the access time manager 100. Again, the isochronous channel is one that provides for periodic reserved transmission of data on a shared media network with either simple or complex periodicity.

Figure 17:
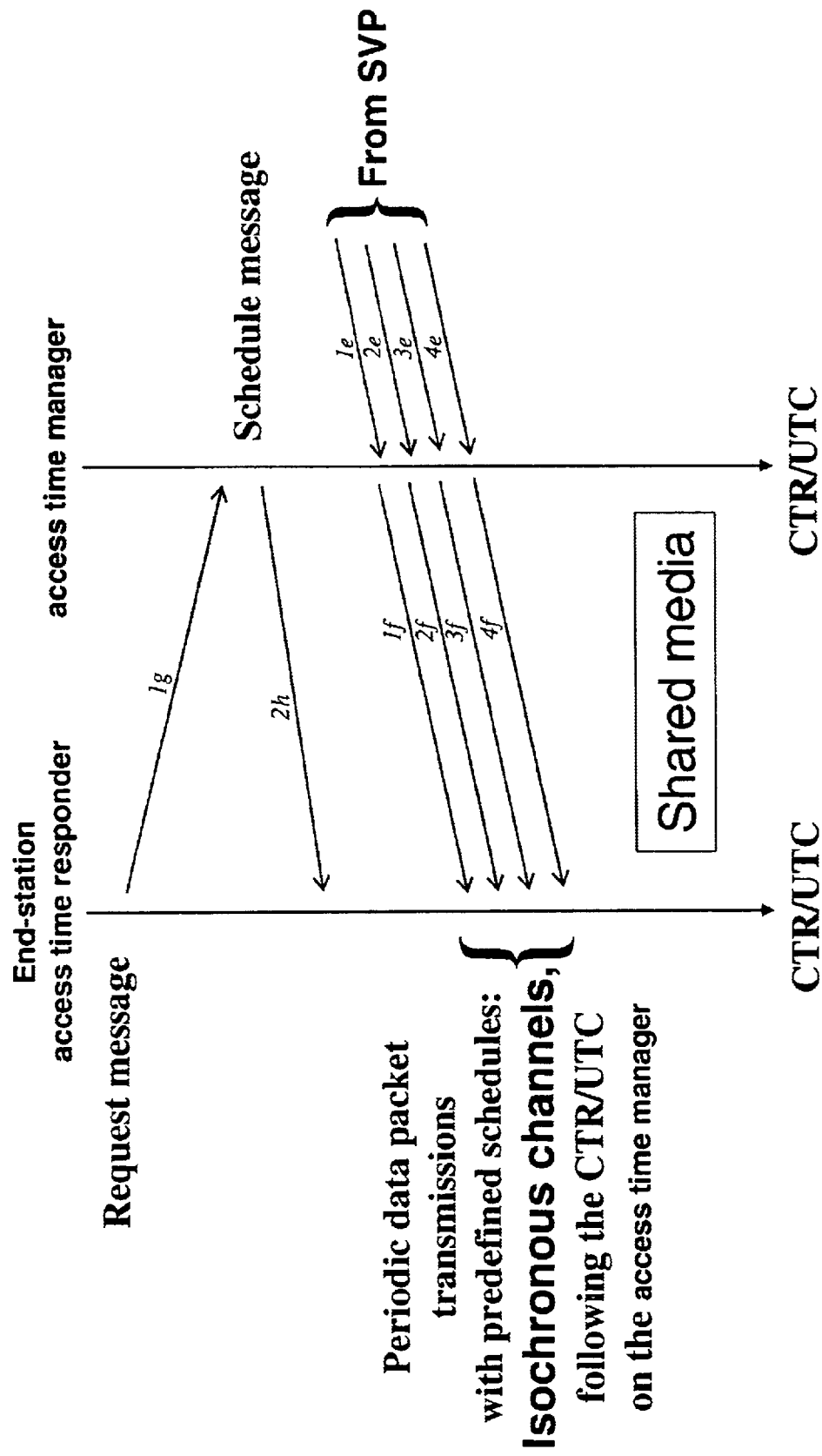
FIG. 17 illustrates the protocol used to schedule reception access to the shared media network as used in the present invention.

Referring simultaneously to both FIGS. 13 and 17, FIG. 17 shows the protocol used to set up a schedule of periodic transmissions from a synchronous virtual pipe 41 to an end-station 300 via the access time manager 100 in the preferred embodiment of the present invention. The end-station 300 that operates as an access time responder issues a request 1g to the access time manager 100. The request 1g describes the nature of the data to be received and the source, permitting the access time manager 100 to determine what parameters (e.g., periodicity, reserved time frames, etc.) needs to be scheduled to fulfill the request.

Upon determining a schedule suitable to satisfy request 1g, the access time manager issues a response 2h to the access time responder which describes to the corresponding end-station the parameters (e.g., periodicity, reserved time frames, etc.) have been reserved for the respective source. These parameters are issued with respect to a common time reference (CTR) 002 shared by all end-stations 300 and the access time manager 100 via the shared media network 200.

Note that in one embodiment the request 1g and the response 2h may occur during a time interval scheduled by the access time manager specifically for use in negotiating requests. In an alternate embodiment, either or both of request 1g and response 2h may occur during other times such as permitted by the existing schedules maintained by the access time manager 100 for shared media network 200.

Upon receipt of the response 2h, the end-station access time responder is then responsive to receive, at the indicated intervals, data forwarded from the synchronous virtual pipe 41 via the access time manager 100. In the illustrated example, the access time responder has been scheduled to receive data on the shared media network 200 at times 1f, 2f, 3f, and 4f. The access time manager 100 accepts data packets from the synchronous virtual pipe 41 at times 1e, 2e, 3e, and 4e, separates the data from those accepted data packets and/or performs any other processing as necessary to support the request, and forwards the corresponding data via the shared media network 200 to the end-station access time responder at times 1f, 2f, 3f, and 4f, respectively. The times 1e, 2e, 3e, 4e, 1f, 2f, 3f, and 4f are all defined with respect to the common time reference signal.

In a preferred embodiment, the access time manager 100 provides a response 2h that describes an isochronous channel on the shared media network 200. An isochronous channel is one that provides for periodic reserved transmission of data on a shared media. The isochronous periodicity may be simple or complex.

Referring again to FIG. 21A with respect to FIG. 16, in the example of FIG. 21A the access time manager 100 would schedule simple isochronous periodic transmissions at times 1f, 2f, 3f, and 4f to be of fixed and equal duration, and thus fixed and equal amounts of data for each transmission.

Referring again to FIG. 21B with respect to FIG. 16, in the example of FIG. 21B the access time manager 100 would schedule complex isochronous periodic transmissions such that the transmission time allocated on the shared media network 200 at time 1f would be greater than the transmission time allocated on the shared media network at times 2f, 3f, and 4f.

FIG. 18A is an illustration of the types and organization of data contained within the request messages in one embodiment of the present invention. Specifically, it illustrates the format of the requests 1a of FIG. 16 and 1g of FIG. 17. The example request as shown contains fields indicating sender identification, device identification, device type, resource description, and request description. The sender identification may be used to identify which of the plurality of end-stations 300 is making the request. The device identification may be used to provide sub-addressing within the access time responder, thus supporting a plurality of co-located devices at the selected end-station. The device type and request description provide further information about the source and/or destination, and the requested schedule of data transfer, including but not limited to the total duration of the transfer, the total size of the transfer, the permitted granularity of the transfer, an indication of whether the data is expected to be bursty in nature, the peak, average, and lowest data rate requirements, the periodicity of the data, and an indication if extended request information is supplied. Extended request information may be used to further detail and describe the requested data transfer beyond the fields indicated in FIG. 18A.

FIG. 18B is an illustration of the types and organization of data contained within the schedule messages in one embodiment of the present invention. Specifically, it illustrates the format of the schedule responses 2b of FIG. 16 and 2h of FIG. 17. The example request as shown contains fields indicating sender identification, device identification, device type, and schedule description. The sender identification, device identification, and device type parallel the corresponding entries in the requests 1a and 1g, respectively, as described above. The schedule description includes, but is not limited to, detailed information regarding the time frames and transmission durations that have been reserved to support the request made by the access time responder. The transmission durations may be referenced in terms of bytes transferred. Alternatively, the transmission durations may be referenced in terms of time frames, fractions of time frames, absolute time duration, and so forth. In any alternative, the information contained in the schedule message as shown in FIG. 18B provides information to the access time responder as to which time intervals are available in the shared media network 200 for its exclusive use to support the request. In the example shown in FIG. 18B, the schedule response includes a series 1 . . . k of schedule sets, wherein each schedule set is comprised of an indication of a specific time frame (e.g., $t_1, t_2, t_3, \ldots t_k$) within a cycle or a super-cycle, along with an indication of the number of bytes (e.g., $s_1, s_2, s_3, \ldots s_k$) that can be transferred within that time frame.

Figure 19:
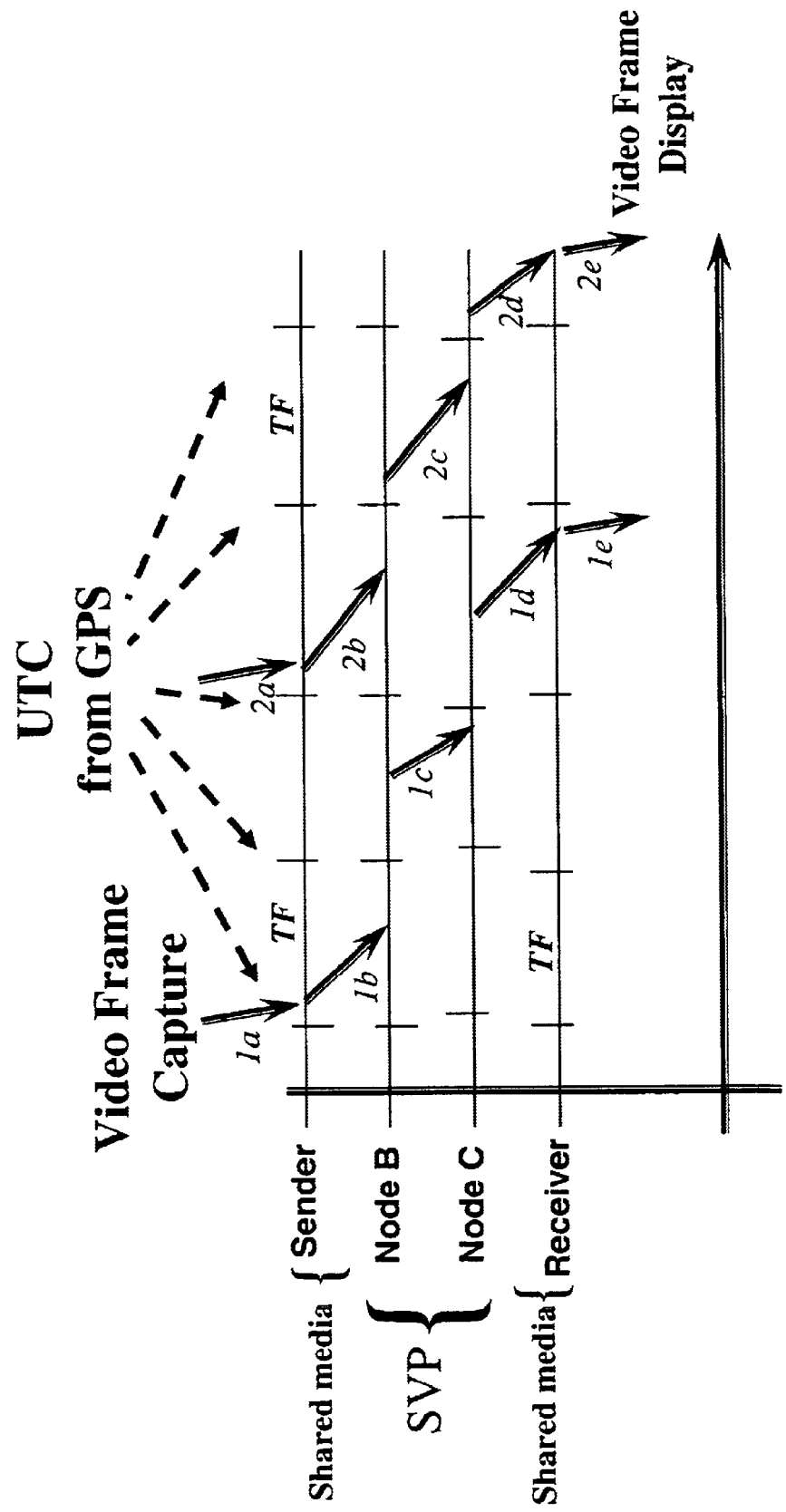
FIG. 19 is a timing diagram illustrating the end-to-end synchronization within synchronous virtual pipe as provided by the present invention.

FIG. 19 is a timing diagram illustrating the end-to-end synchronization within synchronous virtual pipe as provided by the present invention. In the specific example as shown in FIG. 19, a video frame is shown to be transferred from end-to-end in synchronization with a common time reference (e.g., UTC from GPS), but it is to be understood that FIG. 19 is only an example and the invention is not limited to the end-to-end synchronized transfer of video frames. As shown in FIG. 19, and end-station Sender is located on a first shared media network. The end-station Sender captures a video frame at time 1a and provides any processing required to convert the video frame into a form suitable for direct digital transfer over a synchronous digital network. The details of such processing are well-known in the art and lie outside of the novelty of the present invention and thus will not be detailed herein.

The end-station Sender then transmits the data representing the video frame to the shared media network Node B at time frame 1b. The transmission from Sender to Node B is scheduled apriori by interaction between Sender and Node B as shown in FIG. 16 and discussed above. The data comprising transmission 1b is assembled into one or more associated data packets within the shared media network Node B.

The shared media network Node B forwards the data packet(s) through the synchronous virtual pipe connecting Node B to shared media network Node C at time frame 1c. The transmission from Node B to Node C is scheduled apriori by interaction between Node B and Node C as part of the operation of setting up a synchronous virtual pipe, which lies outside of the novelty of the present invention and thus will not be detailed herein. Note that as shown in FIG. 3, one synchronous virtual pipe may span a path containing a plurality of interconnected SVP switches 10 (e.g., A, B, C, D).

The shared media network Node C then forwards the data contained in the data packet(s) received at time frame 1c from shared media network Node C to end-station Receiver at time frame 1d. The transmission from shared media network Node C to end-station Receiver is scheduled apriori by interaction between Node C and end-station Receiver as shown in FIG. 17 and discussed above. The end-station Receiver accepts the video frame data at time 1e and provides any processing required to convert the video frame data into a form suitable for display. The details of such processing are well-known in the art and lie outside of the novelty of the present invention and thus will not be detailed herein.

As shown in FIG. 19, a plurality of individual end-to-end transmissions may be in progress at any given time. In the example illustrated, during the time cycle containing time frame 1d, the end-station Sender may process a second video frame at time frame 2a, and thus relay the processed second video frame to the shared media network Node B at time frame 2b. The present invention supports simultaneous pipelined synchronous operation such that, for example, time frames 2b and 1d may represent the same time frame numbers. It is to be understood that any number of simultaneous end-to-end transfers may be underway at the same time, subject to scheduling constraints due to bandwidth availability, which is clearly known apriori. Further, it is to be understood that because the schedules are established apriori, the indicated pipelined end-to-end operation is free of the problems inherent in the prior art regarding congestion and jitter.

Figure 20A:
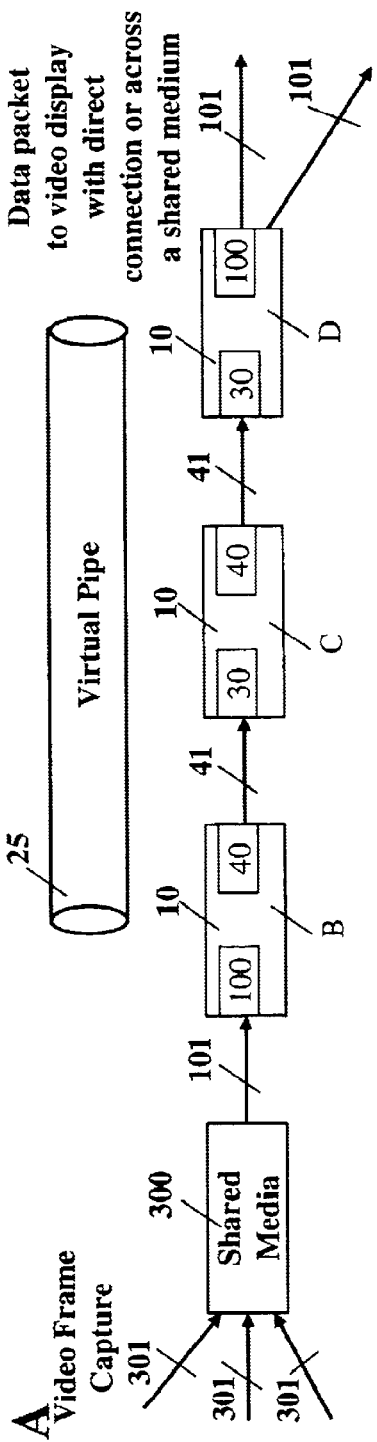
FIG. 20A is a schematic block diagram of an end-to-end communication utilizing the shared media network of the present invention.

FIG. 20A is a schematic block diagram of an end-to-end communication utilizing the shared media network of the present invention, and thus details another aspect of the end-to-end communication as shown in FIG. 19 and described above. In FIG. 20A, links 301 from a plurality of end-stations 300 (not shown) are coupled to the shared media network 200. The shared media network 200 is coupled via link 101 to the access time manager 100, which comprises part of the shared media network B of the present invention. The shared media network B additionally comprises an SVP switch 10 which further additionally comprises an output port 40. The shared media network B is linked via a synchronous virtual pipe 25 to an input port 30 of the shared media network D, by way of any number of interstitial SVP switches (e.g., C) and links 41. Note that as shown in FIG. 3 and previously described, one synchronous virtual pipe 25 may span a path containing a plurality of interconnected SVP switches 10.

Figure 20B:
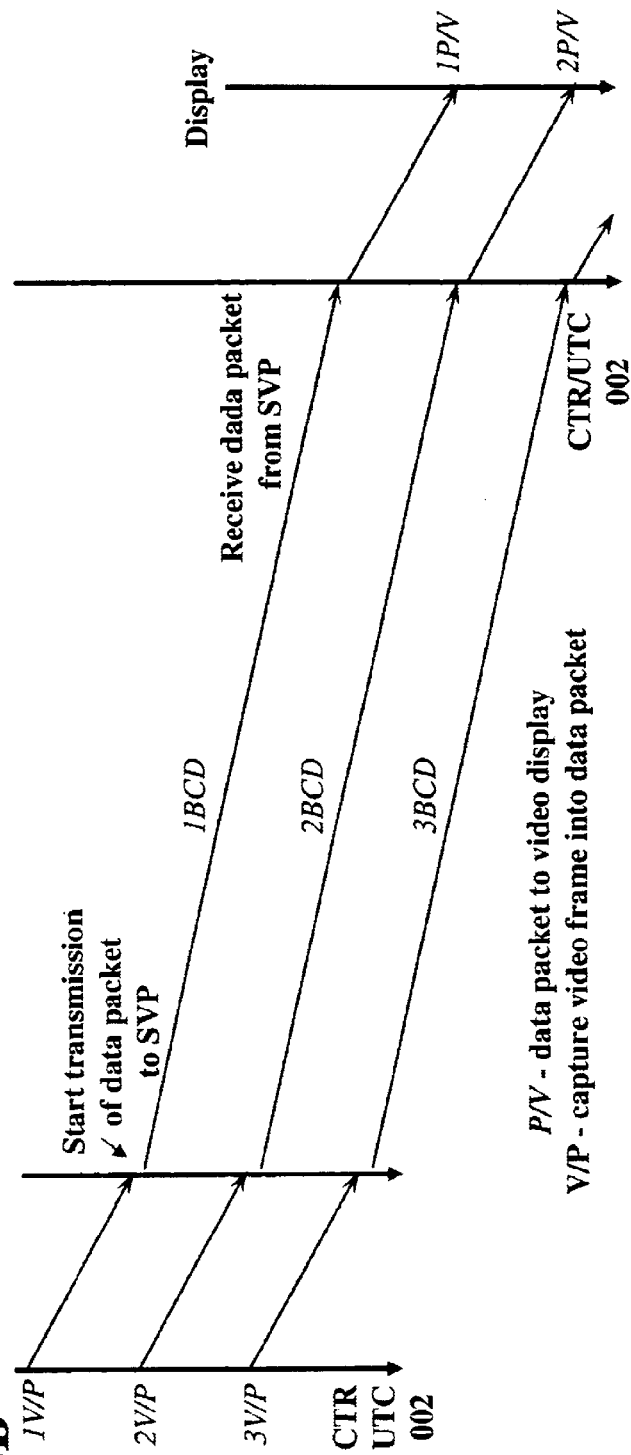
FIG. 20B is a timing diagram illustrating the timely transmission of data in the communication shown in FIG. 20A.

FIG. 20B is a timing diagram illustrating the timely transmission of data in the communication path shown in FIG. 20A, with the time axis directed downwards as shown. Video frames are captured at times 1V/P, 2V/P, and 3V/P and the data representative of the video frames are transported through the shared media network 200 to the shared media network B as shown in the figure. Times 1V/P, 2V/P, and 3V/P are scheduled in advance using the protocol as shown in FIG. 16 and discussed above. Data packets containing data representative of video frames are then relayed via the synchronous virtual pipe 25 at scheduled times 1BCD, 2BCD, and 3BCD (respectively) to shared media network D. The data representative of video frames are then relayed during times 1P/NV, 2P/V, and (not shown) 3P/V, respectively, to an end-station connected to one of the shared media networks available via shared media network D.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A controller system, for scheduling transfer of data packets between one of a point to point network and a shared medium, and an end station and the shared medium, the system comprising:

a source of common time reference signals;

a first scheduling controller for scheduling of a first time frame for the transfer of the data packets from the shared medium to the point to point network, responsive to UTC (Coordinated Universal Time) timing signals; and a second scheduling controller for scheduling a time interval for the transfer of the data packets from the end station to the shared medium, responsive to the first scheduling controller;

wherein the time interval occurs immediately before the first time frame.

2. The system as in claim 1, wherein the first and the second scheduling controllers schedule their respective data transfer in alternating sequential time order to effectuate the transfer of a plurality of the data packets over a plurality of the first time frames and a plurality of the time intervals.

3. The system as in claim 1, further comprising an access time manager, wherein the first scheduling controller and the second scheduling controller are part of the access time manager.

4. The system as in claim 1, wherein the time frames are structured into a time cycle comprised of a fixed number of contiguous time frames which are structured into a stream of a plurality of contiguous time cycles.

5. The system as in claim 4, wherein the scheduling of transmission of respective data packets occurs at a defined one of the time frame positions within each of the time cycles.

6. The system as in claim 5, wherein the scheduling of transmission of respective data packets to the point-to-point network occurs at multiple defined ones of the time frame positions within each of the cycles.

7. The system as in claim 4, wherein a fixed number of a plurality of contiguous ones of the time cycles comprise a super cycle, wherein the super cycle is periodic, wherein the scheduling of the transmission of respective data packets to the point-to-point network occurs at a defined one of time frame positions periodically during at least one associated respective one of the time cycles during each of the super cycles.

8. The system as in claim 4, wherein a fixed number of a plurality of contiguous ones of the time cycles comprise a super cycle, wherein the super cycle is periodic, wherein the scheduling of transmission of respective data packets to the point-to-point network occurs at least at one of the defined time frame positions within each of the super cycles.

9. The system as in claim 1, wherein the common time reference signal is coupled from a GPS (Global Positioning System).

10. The system as in claim 1, wherein the common time reference signal is provided in accordance with the UTC (Coordinated Universal Time) standard.

11. The system as in claim 10, wherein the super cycle duration is equal to at least one of a predefined number of seconds and a predefined fraction of a second, as measured using the UTC (Coordinated Universal Time) standard.

12. The system as in claim 1, wherein there are a plurality of end-stations;
wherein the second scheduling controller schedules a plurality of time intervals for the transfer of plurality of data packets from the end-stations to the shared medium.

13. The system as in claim 12, wherein the transfer of plurality of data packets from the end-stations to the shared medium is responsive to the first scheduling controller.

14. The system as in claim 1, wherein the second scheduling controller is part of the end-station.

15. The system as in claim 14, the first scheduling controller further comprising TICK sending means for sending TICK signals, the second scheduling controller further comprising TICK receiving means for receiving TICK signals;
wherein the transfer of data packets from the end station to the shared medium is regulated by the second scheduling controller responsive to the TICK signals.

16. The system as in claim 14, wherein the first and the second scheduling controllers receive the same common time reference signals.

17. The system as in claim 1, wherein the shared medium is at least one of an IEEE P1394 room network, an Ethernet local area network, a Data-Over-Cable Service Interface Specification (DOCSIS) cable modem network, an IEEE 802.14 cable modem network, an IEEE 802.11 wireless network, a Fiber Channel Arbitrated Loop (FC-AL) storage area network, and an Serial Storage Association (SSA) storage area network.

18. The system as in claim 1, wherein the end-station is at least one of a video camera, a video cassette recorder (VCR), a video disk, a set-top box, a set-top box with Ethernet connection to video camera and VCR, a desktop computer, a mobile unit, a disk drive, a tape drive, a semiconductor disk, an electronic disk, a telephone set, a video display, a video game input and output, and a computer work-station.

19. The system as in claim 1, wherein the second scheduling controller is part of at least one of the following: a cable-modem head-end, a wireless network base station, an IEEE 1394 shared medium, and a host adapter for storage area network.

20. A shared media access time manager (SMATM) System comprising:
a source of a common time reference;
a plurality of endstations;
a shared media network for providing a second time reference divided into time intervals, responsive to the common time reference, which is coupled to at least one end-station of the plurality of end stations;
at least one synchronous virtual pipe comprised of a plurality of linked switches, each switch having at least one input port for synchronous receiving incoming data packets and at least one output port for synchronously transmitting data packets, coupled to the common time reference, and together defining a path, and at least one synchronous virtual pipe having an associated schedule of pre-allocated time frames that are derived from the common time reference; and
an access time manager responsive to the schedule of pre-allocated time frames for allocating specific ones of the time intervals for transfer of an associated one of the data packets between a respective one of the end-stations and the synchronous virtual pipe over the shared media network.

21. The system as in claim 20, wherein the common time reference is equal to the second time reference.

22. The system as in claim 20, wherein the SMATM provides separate scheduling for each of the time intervals.

23. The system as in claim 20, wherein the SMATM schedules the transfer of the respective data packet from the respective end-station to provide for coupling of the respective data packet to the output port immediately prior to the respective pre-allocated time frame associated with the respective data packet.

24. The system as in claim 20, wherein the shared media network is a ring network with concurrent access and spatial bandwidth reuse.

25. The system as in claim 24, wherein a plurality of data packets for a selected plurality of the end-stations are scheduled by the SMATM to transmit data packets during the same time interval, and wherein said plurality of data packets are forwarded in at least one time frame, and to at least one synchronous virtual pipe.

26. The system as in claim 20, wherein the SMATM is at least one of a desk-top computer, a computer work-station, an host adapter, a cable-modem head-end, and a wireless base-station.

27. The system as in claim 20, wherein the SMATM further comprises of means for processing a plurality of format types of data packets.

28. The system as in claim 27, wherein the data packets within shared media network are of a first format type;
  wherein the first format type is at least one of an ATM, an IP, a fiber channel for FC-AL, an SSA, a DOCSIS, and an IEEE 802.11.
  wherein the data packets within the synchronous virtual pipe are of a second format type,
  wherein the second format type is at least one of an ATM, an IP, a fiber channel for FC-AL, an SSA, a DOCSIS, and an IEEE 802.11.

29. The system as in claim 28, wherein the SMATM converts the data packets of the first format type to the data packets of second format type.

30. The system as in claim 28, wherein the SMATM converts the data packets of the second format type to the data packets of the first format type.

31. The system as in claim 28, wherein the SMATM converts a first number of data packets of the first format type to a second number of data packets of the second format type.

32. The system as in claim 31, wherein each respective one of the first number of data packets is scheduled in a corresponding respective one of the time intervals;
  wherein each of the time intervals can selectively have associated with it scheduled data packets;
  wherein each respective one of the second number of data packets is scheduled in a corresponding respective one of the time frames; and
  wherein each time frame can selectively have associated with it scheduled data packets.

33. The system as in claim 20, wherein the SMATM further comprises a first scheduling controller and transmit buffer;
  wherein the data packet further comprises a pipe-ID (PID) and a time stamp;
  wherein the SMATM provides for attaching a time of arrival (TOA) to incoming data packets from the shared media network;
  wherein the first scheduling controller and transmit buffer provides for assigning selected predefined time frames for transfer out of the output port for synchronously transmitting data packets over the synchronous virtual pipe responsive to the time of arrival, PID, time stamp and the common time reference.

34. The system as in claim 20, wherein the SMATM further comprises a second scheduling controller and transmit buffer;
  wherein the data packet further comprises a pipe-ID (PID) and a time stamp;
  wherein the SMATM provides for attaching a time of arrival (TOA) to incoming data packets from the synchronous virtual pipe; and
  wherein the second scheduling controller and transmit buffer provides for assigning selected predefined time intervals for transfer the data packets over the shared media network responsive to the time of arrival, PID, time stamp, and responsive to the second time reference.

35. The system as in claim 20, wherein the common time reference and the second time reference are the same.

36. A communications management system comprising:
  a common time reference, wherein the common time reference is partitioned into a plurality of contiguous time frames;
  a synchronous virtual pipe comprised of a plurality of linked switches, each switch having at least one input port and at least one output port, coupled to the common time reference, and together defining a path;
  a source for transmitting periodic data bursts;
  a destination for receiving periodic data bursts;
  a first shared media network, coupled to the source for transmitting periodic data bursts and to the synchronous virtual pipe; and
  a second shared media network, coupled to the synchronous virtual pipe and to the destination for receiving periodic data bursts.

37. The system as in claim 36, wherein the first shared media network is coupled to the input of the synchronous virtual pipe; and
  wherein the second shared media network is coupled to the output of the synchronous virtual pipe.

38. The system as in claim 36,
  wherein there are a plurality of synchronous virtual pipes;
  wherein the first shared media network is coupled to the input of the a first synchronous virtual pipe and is coupled to the output of the a second synchronous virtual pipe; and
  wherein the second shared media network is coupled to the input of the a third synchronous virtual pipe and is coupled to the output of the a fourth synchronous virtual pipe.

39. The system as in claim 36, wherein the periodic data bursts represent captured video frames by a video camera.

40. The system as in claim 36, wherein the destination for receiving periodic data bursts provides for a display of video frames responsive to the respective periodic data bursts.

41. The system as in claim 40, wherein there are a plurality of destinations for receiving the periodic data bursts, each providing for a respective display of video frames to a respective display.

42. The system as in claim 40, wherein the display is at least one of a television (TV) set, a high definition TV (HDTV) set, a computer monitor, a flat panel display, a movie theater, a video display in a conference room, and a hand-held wireless video display.

43. The system as in claim 36, further comprising a scheduling controller for defining one or more predefined time frames, and for scheduling the a synchronous transfer of the periodic data bursts commencing during respective scheduled ones of the time frames occurring closest in time to an occurrence of the respective periodic data bursts from the source.

44. The system as in claim 43, wherein the synchronous transfer is from the source to the destination.

45. The system as in claim 43, wherein the source is coupled to at least one of a first IEEE 1394 shared media network, a first cable-modem system, and a second IEEE 1394 shared media network that is coupled to a second cable-modem system;
  wherein the display is coupled to the destination via at least one of a third IEEE 1394 shared media network, a third cable-modem system, and a fourth IEEE 1394 shared media network that is coupled to a fourth cable-modem system.

46. The system as in claim 44, wherein the synchronous transfer is from a plurality of sources to a plurality of destinations.

47. The system as in claim 36, wherein the periodic data bursts have complex periodicity.

48. The system as in claim 47, wherein a predefined number of contiguous k time frames are grouped into a time cycle, wherein k is at least 1;

wherein a predefined number of contiguous l time cycles are grouped into a super cycle, and wherein l is at least 1;

wherein the source of periodic data bursts are scheduled for transmission in reoccurring predefined time frames in selected ones of said time cycles and super cycles.

49. The system as in claim 48, wherein the periodic data bursts are scheduled for transmission in reoccurring predefined time frame positions within selected ones of the time cycles within each of the super cycles.

50. A communications scheduling system comprising:
a common time reference, wherein the common time reference is partitioned into contiguous time frames;
  a source for transmitting periodic data bursts;
  a destination for receiving periodic data bursts;
  a first shared media network, coupled to the source for transmitting periodic data bursts; and
  a second shared media network, coupled to the destination for receiving periodic data bursts;
a scheduling controller for providing scheduling of the selective coupling of the first and second shared media networks to provide for transferring the respective periodic data bursts from the source to the destination during a respective scheduled time frame position;
  wherein a predefined number of contiguous k time frames are grouped into a time cycle, wherein k is at least 1;
  wherein a predefined number of contiguous l time cycles are grouped into a super cycle, and wherein l is at least 1;
  wherein the periodic data bursts are scheduled for transmission in reoccurring predefined time frame positions within selected ones of the time cycles within each of the super cycles.

51. The system as in claim 50, wherein the destination is coupled to a video display via at least one of an IEEE 1394 shared media network, a cable-modem shared media network, an IEEE 802.3 (Ethernet) shared media network, a second IEEE 802.3. (Ethernet) shared media network that is connected to a second cable-modem shared media network, and a second IEEE 1394 shared media network that is connected to a third cable-modem shared media network.

52. The system as in claim 50, wherein the source for transmitting periodic data bursts is a video source, wherein the video source provides an output of Motion Picture Expert's Group (MPEG) video I frames, selectively followed by an integer number of MPEG video P frames and MPEG video B frames;
  wherein following a single MPEG video I frame there is between zero and a plurality of MPEG video P frames, and following that there is between zero and a plurality of zero or more MPEG video B frames.

53. The system as in claim 52, wherein the transmission of the MPEG video I frames is scheduled for reoccurring in a first predefined selected ones of the time frames within a first predefined selected ones of the time cycles within each of the super cycles;
  wherein the transmission of the MPEG video B frames is scheduled for reoccurring in a second predefined selected ones of the time frames within a second predefined selected ones of the time cycles within each of the super cycles; and
  wherein the transmission of the MPEG video P frames is scheduled for reoccurring in a third predefined selected ones of the time frames within a third predefined selected ones of the time cycles within each of the super cycles.

54. The system as in claim 50, wherein the common time reference signal is provided in accordance with the UTC (Coordinated Universal Time) standard.

55. The system as in claim 50, wherein the super cycle duration is equal to at least one of a predefined number of seconds and a predefined fraction of a second, as measured using the UTC (Coordinated Universal Time) standard.

56. The system as in claim 53, wherein the first, second, and third predefined selected ones of the time frames are the same.

57. The system as in claim 53, wherein the first, second, and third predefined selected ones of the time frames are consecutive.

58. A method for scheduling transfer of data packets between one of a point to point network and a shared medium, and alternatively between an end station and the shared medium, the method comprising:
  providing for signaling of a common time reference;
  scheduling a first time frame for the transfer of the data packets from the shared medium to the point to point network, responsive to UTC (Coordinated Universal Time) timing signals; and
  scheduling a time interval for the transfer of the data packets from the end station to the shared medium, responsive to the scheduling of the first time fame,
    wherein the time interval occurs immediately before the first time frame.

59. The method as in claim 58, further comprising:
  alternating in sequential time order between the scheduling of the first time frame and the scheduling of a second time frame, to effectuate the transfer of a plurality of the data packets over a plurality of the first time frames and a plurality of the time intervals.

60. The method as in claim 58, further comprising: providing for access time management, controlling the scheduling of the first time frame and the scheduling of the second time fame.

61. The method as in claim 58, further comprising: structuring the time frames into a time cycle comprised of a fixed number of contiguous time frames which are structured into a stream of a plurality of contiguous time cycles.

62. The method as in claim 61, further comprising: scheduling transmission of respective data packets to occur at a defined one of the time frame positions within each of the time cycles.

63. The method as in claim 62, further comprising: scheduling transmission of respective data packets to the point-to-point network to occur at multiple defined ones of the time frame positions within each of the cycles.

64. The method as in claim 61, further comprising:
  configuring a fixed number of a plurality of contiguous ones of the time cycles into a super cycle,
  defining a plurality of super cycles as periodic, and
  scheduling transmission of respective ones of the data packets to the point-to-point network to each occur at a defined one of time frame positions periodically during at least one associated respective one of the time cycles during each of the super cycles.

65. The system as in claim 61, further comprising:
  configuring a fixed number of a plurality of contiguous ones of the time cycles into a super cycle,
  defining a plurality of super cycles as periodic, and
  scheduling transmission of respective ones of the data packets to the point-to-point network to each occur at least at one of the defined time frame positions within each of the super cycles.

66. The method as in claim 58, further comprising: coupling a common time reference signal, responsive to the providing for signaling of a common time reference, to a GPS (Global Positioning System).

67. The method as in claim 58, further comprising: providing a common time reference signal, responsive to the providing for signaling of a common time reference, in accordance with the UTC (Coordinated Universal Time) standard.

68. The method as in claim 58, providing the scheduling of the time interval within the end-station.

69. The method as in claim 68, further comprising: sending TICK signals as a part of the scheduling of the first time frame;

receiving TICK signals, as a part of the scheduling of the time interval, and transferring data packets from the end station to the shared medium responsive to the TICK signals.

70. The method as in claim 58, wherein the shared medium is further comprised of at least one of an IEEE P1394 room network, an Ethernet local area network, a Data-Over-Cable Service Interface Specification (DOCSIS) cable modem network, an IEEE 802.14 cable modem network, an IEEE 802.11 wireless network, a Fiber Channel Arbitrated Loop (FC-AL) storage area network, and an Serial Storage Association (SSA) storage area network.

71. The method as in claim 58, wherein the end-station is further comprised of at least one of a video camera, a video cassette recorder (VCR), a video disk, a set-top box, a set-top box with Ethernet connection to video camera and VCR, a desktop computer, a mobile unit, a disk drive, a tape drive, a semiconductor disk, an electronic disk, a telephone set, a video display, a video game input and output, and a computer work-station.

72. The method as in claim 58, wherein the scheduling of the time interval is comprised of: utilizing part of at least one of a cable-modem headed, a wireless network base station, an IEEE 1394 shared medium, and a host adapter for storage area network.

\* \* \* \* \*